US010669042B2

(12) United States Patent
Molnar et al.

(10) Patent No.: US 10,669,042 B2
(45) Date of Patent: Jun. 2, 2020

(54) UNMANNED AERIAL VEHICLE WITH LIGHTING AND COOLING THEREFOR

(71) Applicant: WET, Sun Valley, CA (US)

(72) Inventors: Dezso Molnar, Sun Valley, CA (US); John Canavan, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 14/922,061

(22) Filed: Oct. 23, 2015

(65) Prior Publication Data

US 2016/0152345 A1    Jun. 2, 2016

Related U.S. Application Data

(60) Provisional application No. 62/067,978, filed on Oct. 23, 2014.

(51) Int. Cl.
*B64D 47/06* (2006.01)
*B64C 39/02* (2006.01)
*B64D 47/04* (2006.01)
*F21V 29/83* (2015.01)
*F21V 29/67* (2015.01)
(Continued)

(52) U.S. Cl.
CPC .............. *B64D 47/06* (2013.01); *B64C 27/08* (2013.01); *B64C 39/024* (2013.01); *B64D 47/04* (2013.01); *F21V 29/677* (2015.01); *F21V 29/83* (2015.01); *B64C 2201/027* (2013.01);
(Continued)

(58) Field of Classification Search
CPC ............ B64C 39/024; B64C 2201/146; B64C 2201/108; B64C 2201/127; B64C 27/08; B64C 2201/042; B64D 47/08; B64D 1/02; B64D 2027/026; B64D 27/02; B64D 27/24; B64D 33/08; B64D 47/06; B64D 47/04; F21V 29/83; F21V 23/006; F21V 29/677

See application file for complete search history.

(56) References Cited

U.S. PATENT DOCUMENTS 3,245,637 A * 4/1966 Eickmann ............... B63B 35/14
                                                    244/2
3,503,574 A * 3/1970 Eickmann ............... B64C 27/12
                                                    244/17.17
(Continued)

FOREIGN PATENT DOCUMENTS

CN    103241377    8/2013
CN    203294314    11/2013
(Continued)

OTHER PUBLICATIONS

Spreading Wings S900 User Manual, Aug. 2014.*
(Continued)

*Primary Examiner* — Assres H Woldemaryam
(74) *Attorney, Agent, or Firm* — Maceiko IP

(57) ABSTRACT

An unmanned aerial vehicle (UAV) that includes a light and a cooling system is described. The light fitted to the UAV may be bright since heat it generates will be cooled by thermal conduction, convection and/or heat absorption. The light may be cooled by the airflow generated by the propellers. The cooling system of the lighted UAV may include radiator that may conduct heat to the environment and/or include an internal liquid cooling system. The cooling system may include dedicated fans to cool the lights.

16 Claims, 19 Drawing Sheets

(51) Int. Cl.
*B64C 27/08* (2006.01)
*F21W 107/30* (2018.01)
*F21Y 115/10* (2016.01)

(52) U.S. Cl.
CPC .. *B64C 2201/108* (2013.01); *B64C 2201/123* (2013.01); *F21W 2107/30* (2018.01); *F21Y 2115/10* (2016.08)

(56) References Cited

U.S. PATENT DOCUMENTS

| | | | |
|---|---|---|---|
| 4,010,619 | A | 3/1977 | Hightower et al. |
| 5,293,304 | A | 3/1994 | Godfrey |
| 5,769,359 | A | 6/1998 | Rutan et al. |
| 6,200,185 | B1 | 3/2001 | Kuster, Jr. |
| 6,270,038 | B1 | 8/2001 | Cycon et al. |
| 6,547,180 | B1 | 4/2003 | Cassidy |
| 6,575,402 | B1 | 6/2003 | Scott |
| 6,749,154 | B1 | 6/2004 | Johnson |
| 6,933,965 | B2 | 8/2005 | Heafitz |
| 7,055,994 | B2 | 6/2006 | Martin |
| 7,082,706 | B1 | 8/2006 | Stinis et al. |
| 7,249,732 | B2 | 7/2007 | Sanders et al. |
| 7,324,016 | B1 | 1/2008 | Milgram |
| 7,414,546 | B2 | 8/2008 | Singer et al. |
| 7,472,866 | B2 | 1/2009 | Heaston et al. |
| 7,631,834 | B1 | 12/2009 | Johnson et al. |
| 7,668,403 | B2 | 2/2010 | Kanowitz |
| 8,056,461 | B2 | 11/2011 | Bossert et al. |
| 8,091,822 | B2 | 1/2012 | Boyce |
| 8,100,649 | B2 | 1/2012 | Okimura |
| 8,109,711 | B2 | 2/2012 | Blumer et al. |
| 8,123,460 | B2 | 2/2012 | Collette |
| 8,157,383 | B2 | 4/2012 | Scanlon |
| 8,369,399 | B2 | 2/2013 | Egnal et al. |
| 8,434,920 | B2 | 5/2013 | Jones |
| 8,511,828 | B2 | 8/2013 | Fuller et al. |
| 8,554,395 | B2 | 10/2013 | Andersson |
| 8,567,718 | B1 | 10/2013 | McDonnell |
| 8,596,572 | B1 | 12/2013 | Kirshman et al. |
| 8,600,602 | B1 | 12/2013 | McAndrew et al. |
| 8,646,719 | B2 | 2/2014 | Morris et al. |
| 8,777,157 | B2 | 7/2014 | Barrett et al. |
| 8,825,225 | B1 | 9/2014 | Stark et al. |
| 8,862,285 | B2 | 10/2014 | Wong et al. |
| 9,169,030 | B2 | 10/2015 | Wong et al. |
| 9,174,733 | B1 | 11/2015 | Burgess et al. |
| 10,364,026 | B1 | 7/2019 | Hanlon et al. |
| 10,384,777 | B1 | 8/2019 | Welsh |
| 2002/0049728 | A1 | 4/2002 | Kaku |
| 2002/0171927 | A1 | 11/2002 | Barnes |
| 2004/0020999 | A1 | 2/2004 | Beidokhti |
| 2005/0146884 | A1 | 7/2005 | Scheithauer |
| 2005/0219479 | A1 | 10/2005 | Mugrauer |
| 2006/0140644 | A1 | 6/2006 | Paolella |
| 2008/0165547 | A1* | 7/2008 | Amor ............... B63B 45/02 362/373 |
| 2008/0313937 | A1 | 12/2008 | Boyce |
| 2010/0027281 | A1 | 2/2010 | Waters et al. |
| 2011/0180667 | A1 | 7/2011 | O'Brien et al. |
| 2012/0044710 | A1* | 2/2012 | Jones ............... B64C 39/024 362/470 |
| 2012/0056041 | A1* | 3/2012 | Rhee ............... B64C 25/32 244/4 R |
| 2012/0112008 | A1 | 5/2012 | Holifield et al. |
| 2012/0153087 | A1 | 6/2012 | Collette et al. |
| 2012/0200703 | A1 | 8/2012 | Nadir et al. |
| 2012/0250335 | A1 | 10/2012 | Nakano |
| 2013/0062457 | A1 | 3/2013 | Deakin |
| 2013/0077330 | A1 | 3/2013 | Hessling |
| 2013/0134254 | A1 | 5/2013 | Moore |
| 2013/0233964 | A1* | 9/2013 | Woodworth ........ B64C 37/02 244/2 |
| 2013/0248097 | A1 | 9/2013 | Ploss, Jr. |
| 2013/0314502 | A1* | 11/2013 | Urbach ............... H04N 7/181 348/46 |
| 2014/0002990 | A1* | 1/2014 | Sharma ............... F21V 29/74 361/694 |
| 2014/0018976 | A1* | 1/2014 | Goossen ............... G06F 17/00 701/2 |
| 2014/0131510 | A1* | 5/2014 | Wang ............... B64C 39/024 244/17.23 |
| 2014/0217242 | A1 | 8/2014 | Muren et al. |
| 2014/0231590 | A1 | 8/2014 | Trowbridge et al. |
| 2014/0233099 | A1 | 8/2014 | Stark et al. |
| 2014/0236388 | A1 | 8/2014 | Wong et al. |
| 2014/0257595 | A1 | 9/2014 | Tillmann |
| 2014/0263852 | A1 | 9/2014 | Walker et al. |
| 2014/0268838 | A1 | 9/2014 | Kimball et al. |
| 2014/0374535 | A1 | 12/2014 | Wong et al. |
| 2015/0129716 | A1 | 5/2015 | Yoffe |
| 2015/0154890 | A1 | 6/2015 | Savitsky et al. |
| 2015/0329218 | A1 | 11/2015 | McDonnell et al. |
| 2015/0362917 | A1 | 12/2015 | Wang et al. |
| 2016/0033855 | A1 | 2/2016 | Wong et al. |
| 2016/0041628 | A1 | 2/2016 | Verma |
| 2016/0068266 | A1* | 3/2016 | Carroll ............... B64C 11/20 244/53 R |
| 2016/0200437 | A1 | 7/2016 | Ryan et al. |

FOREIGN PATENT DOCUMENTS

| | | |
|---|---|---|
| DE | 20 2009 017 291 U1 | 3/2010 |
| JP | 2012-190557 | 10/2012 |
| JP | 2013-211200 A | 10/2013 |
| KR | 10-2008-0074045 | 8/2008 |
| KR | 10-2010-0041367 A | 4/2010 |
| KR | 10-2011-0090231 | 8/2011 |
| WO | WO 2002-044809 | 6/2002 |
| WO | WO2006/016018 | 2/2006 |
| WO | WO 2007-141795 | 12/2007 |
| WO | WO 2013-162128 | 10/2013 |

OTHER PUBLICATIONS

Wang et al. "A Cooling System with a Fan for Thermal Management of High-Power LEDs", 2010.*
Lai et al. "Liquid cooling of bright LEDs for automotive applications", 2009.*
"Hear Transfer by Radiation", May 2010.*
"Phantom 2 User manual", Apr. 30, 2014.*
PCT, International Search Report and Written Opinion of the International Searching Authority, PCT/US2015/057249, dated Feb. 17, 2016, 10 pages.
www.electronics-cooling.com, Direct Spray Cooling and System-level Comparisons—Electronics Cooling Magazine—Focused on Thermal.
Management, Andy Finch and Eric Ballew, Aug. 2009, 5 pages.
www.ledsmagazine.com/articles/2008/07, Oxley Supplies LED Lights to BAE Unmanned Air Vehicle, LEDs Magazine, Jul. 2008, 11 pages.
Vila, Oscar; [Power Electronics 01] Design of the Power Electronics of a Tethered UAV; Master Thesis; Bio, Electro and Mechanical Systems, http://beams.ulb.ac.be/student-projects; Oct. 20, 2014; 2 pages.
Eurolink Systems; Cobra—Micro Tethered Surveillance; ERMES by EuroLink Systems, Ermes Technologies; Oct. 21, 2014, 3 pages.
Staes, Patrick; Drone @ Work; Aerial Imaging and Filming; http://drone-at-work.com; Oct. 21, 2014, 6 pages.
Quick, Darren; [CyPhy Works' UAVs Use Ground-Based Power to Stay Aloft Indefinitely; www.gizmag.com, Dec. 5, 2012, 4 pages.
Burkhart, Ford; DSS 2013: Tiny Drone Flies on Fiber-Optic Power; the business of photonics optics.org; http://optics.org/news; May 2, 2013; 2 pages.

* cited by examiner

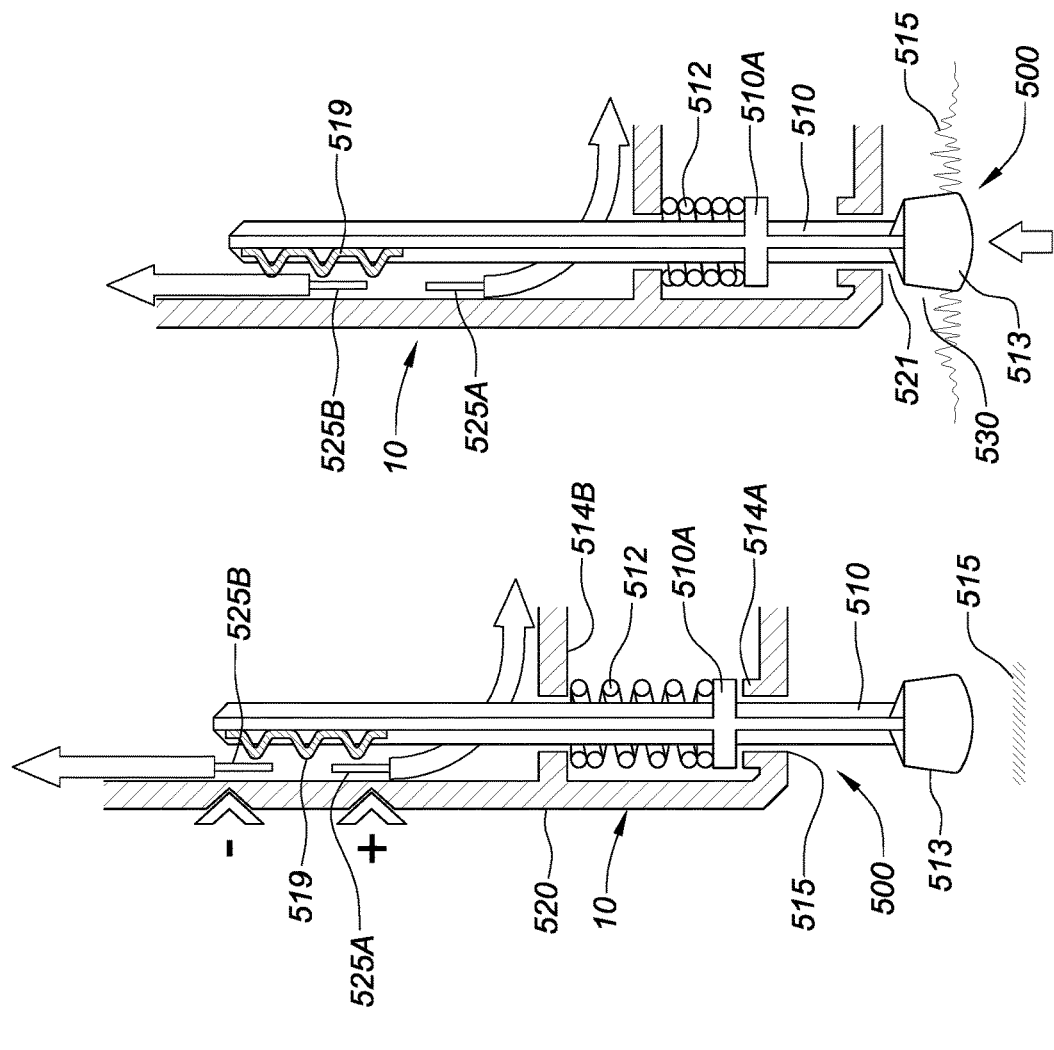
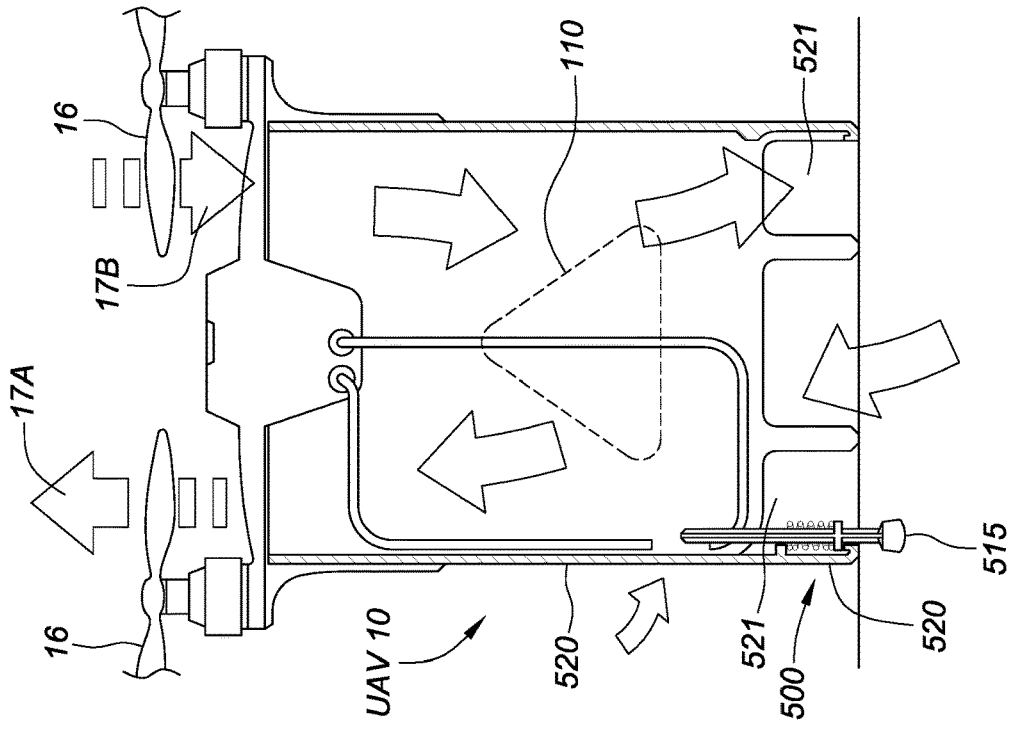
FIG. 12C
FIG. 12B
FIG. 12A

UNMANNED AERIAL VEHICLE WITH LIGHTING AND COOLING THEREFOR

CROSS REFERENCE TO RELATED APPLICATION

The application claims the benefit of U.S. Provisional Application No. 62/067,978, filed Oct. 23, 2014, the contents of which are incorporated herein by reference.

FIELD OF THE INVENTION

The field of the invention generally relates to unmanned aerial vehicles (UAVs), including UAVs that are fitted with one or more lights and cooling mechanisms therefor.

BACKGROUND OF THE INVENTION

In recent years, UAVs have been developed and put into use in different applications. Besides UAVs such as large drones used in military applications, smaller consumer-level UAVs have recently become more popular in civilian applications due to their ease of use. For example, smaller self-stabilizing UAVs are now commonly used by aviation enthusiasts with little or no flight training, similar to how small-scale airplanes and helicopters have been used by skilled hobbyists for some time.

More recently, UAVs have been used as display items, to carry objects and serve other functions. For example, UAVs have been fitted with lights and flown in formation under computer control by the Austrian group Ars Electronica in 2012 to provide a visual display where the positions of the lights may be varied. As another example, U.S. Publication No. 2014/0236388 by Disney Enterprises, discloses the use of lighted UAVs that fly under computer control. In this application, the lighted UAVs are referred to as flying lanterns or flying pixels (flixels).

However, the amount of light provided by the foregoing and other current lighted UAVs is significantly limited. For example, current lighted UAVs are generally fitted with lights that do not provide significant lumens. This is a significant problem where, for example, the UAV is intended to fly high above the ground or otherwise viewed from a great distance. In this situation, because the light fitted to the UAV does not provide significant lumens, it may not be readily visible to observers on the ground. As another example, if the lighted UAV is operated in an area where there other lighting exists nearby, the light on the UAV may be drowned out or otherwise non-discernible to observers on the ground due to such "light pollution." As yet another example, where the UAV is flying in daylight, low power lighting used with current UAVs could be imperceptible.

A reason why current lighted UAVs are fitted with low power lighting is because they cannot accommodate the heat generated by high-power lights. For example, LED lights that provide significant lumens also generate significant heat, and none of the above-referenced lighted UAVs address heat issues associated with such powerful LEDs.

Furthermore, simply fitting high-lumen lights to existing UAVs without cooling mechanisms presents other significant heating issues. For example, many high-lumen LED lights would overheat in a very short time, thereby preventing any type of sustained display time. In reality, such high-lumen LEDs could create a fire in a short amount of time if not cooled. In this case, even one minute flight display times are not possible, and such heat could disable the aircraft and cause a safety hazard to viewers. In any event, requiring a UAV to land after a very short flight time to avoid overheating the light or heat damage to the UAV severely limits the manners in which the UAV may be used.

Beyond cooling issues existing with high-lumen lights, the UAV may include other components such as electrical circuits, motors, and the like that generate heat and that may fail without cooling if the UAV operates those devices for extended periods. The above-referenced lighted UAVs do not address this issue.

Accordingly, there is a need for a UAV with a high-lumen lighting system so that the lighting display seen from distances, is not drowned out by nearby light pollution and/or may be visible during daylight hours. There is also a need for a UAV with a cooling system that may cool high-lumen lighting and other heat-generating components to avoid damage or other heat generated problems.

SUMMARY OF THE INVENTION

The current invention addresses the foregoing drawbacks and provides for unique and innovative uses of UAVs, which may also be referenced herein as drones, quadcopters, multicopters or by other appropriate terms. To this end, the UAVs of the current invention may have any number of propellers or other propulsion systems and are not limited to, e.g., four propellers as found in quadcopters.

In a first aspect of the invention, a UAV is described that includes one or more lights and a system to cool the light(s). This allows the UAV to be fitted with a high-lumen light source that may be seen from a significant distance, be discernible despite nearby light pollution and/or be discernible in daylight. To this end, the cooling may be provided by the downward airflow, or prop wash, generated by the UAV's propeller blades. This airflow may be directed to flow to and/or over the light(s) to cool them. To this end, the light or lights fitted to the UAV may be positioned so as to be in the flow path of the prop wash. Preferably, the lights may be positioned below the outer portion of the propeller where the airflow is most significant.

In another aspect of the invention, the cooling system may include components that transfer heat away from the light(s) through conduction. For example, the cooling system may include a thermally conductive plate with cooling fins that receives heat conducted away from the light(s), and that transfers this heat to the surrounding environment. The lights themselves may also include thermally conductive components to assist in the cooling.

In another aspect of the invention, the light(s) may be cooled by heat absorption in that components of the cooling system may be painted, coated or otherwise made to be black or other dark color so that they absorb heat from the light(s) as opposed to reflecting it back towards the lights.

The current invention may include any one or more of the foregoing described convection, conduction or absorption modes of heat transfer to cool the light(s) fitted to the UAV. The cooling capacity of the cooling system may be adjusted to accommodate the varying levels of heat provided by different type of lights. To this end, dimensions and other properties of the cooling components discussed herein may be adjusted to provide adequate cooling without excessive weight.

In another aspect of the invention, the UAV may also include a radiator or heat exchanger that may work with the airflow of the prop wash to cool the light(s) fitted to the UAV. To this end, the radiator or heat exchanger may serve as a heat sink for heat generated by the light(s), in that it may be cooled by the prop wash and thus be capable of receiving more heat from the light(s) and thus extending their duty cycle to potentially continuous operation.

In another aspect of the invention, the UAV may include a liquid cooling system which may be used separately or in addition to the air cooling mentioned above. This type of cooling may provide a more concentrated heat reducing environment at the light(s). The liquid cooling system may include one or more heat exchangers that use ambient air to cool liquid in the cooling system that in turn cools the light(s). The liquid cooling system may include one or more pumps to circulate the liquid within the cooling system. Alternatively, the liquid cooling system may passively function as a heat pipe without the aid of a pump.

In another aspect of the invention, the UAV may include a fan dedicated to cooling the light(s). The dedicated fan may be used separately or in addition to the above-referenced cooling mechanisms. The fan may cool the light(s) and other heat-generating components residing in or on the UAV.

In another aspect of the invention, the lighting and cooling system, and the battery or other power source, may be positioned so that their respective weights counterbalance each other, thereby allowing the UAV to controllably fly.

In another aspect of the invention, the UAV may be used in connection with a water and/or lighting display. In this situation, water from the water display may be used to cool the light(s) fitted to the UAV. Furthermore, light from the UAV(s) may illuminate water in the display to enhance the overall visual effect of the display. For example, water shot into the air may contact a flying UAV's light(s) and cool them. As another example, the UAV may be tethered to a lighted vessel residing in a pool or other body of water. The vessel may travel at or below the water surface so that its lights are cooled by the water. The UAV may tow the vessel as part of a water and lighting display.

In another aspect of the invention, the UAV may include a switch that is turned on by the prop wash airflow provided by the propellers. This switch may activate the light and other electrical appliances that may be included in the UAV. In this manner, the light(s) and other components may not activate until there is airflow available to cool it.

In another embodiment, the UAV may include a probe that extends below the legs or other bottom surface of the UAV. In this embodiment, the probe may remain in contact with the ground or other landing area after the UAV takes off, and may also contact the ground before the UAV lands. The probe may open and close a switch that turns the light off and on in a manner which ensures that the airflow of the propellers will be available for the lights when they are turned on. That is, the probe may be in a retracted position and remain in contact with the ground as the UAV takes off, such that airflow is available. When the UAV ascends enough so that the probe no longer touches the ground and extends to an extended position, a switch may be closed to turn the light(s) on. And when landing, the probe may contact the ground first and be forced into a retracted position to open the switch and turn the light(s) off.

In another aspect of the invention, the UAV may carry a laser light that is able to create displays and projections bright enough to be seen in broad daylight. To provide safety to viewers, the UAV may include safeguards to avoid the laser from projecting into the eyes of viewers, to include infra-red detectors, designated wall targets for projections that provide confirmation that the UAV's laser is directed at a target and other similar capabilities.

BRIEF DESCRIPTION OF THE DRAWINGS

The following detailed description of the preferred embodiments may be better understood with references to the accompanying drawings, wherein:

FIGS. 12A-C are section views of a lighted UAV including a probe and associated switch that is turned on after the UAV takes off and the probe retracts, and is turned off before the UAV lands. FIGS. 12B and 12C show the probe in an extended (switch closed) position and retracted (switch open) position.

DETAILED DESCRIPTION OF THE PREFERRED EMBODIMENTS

Figure 1:
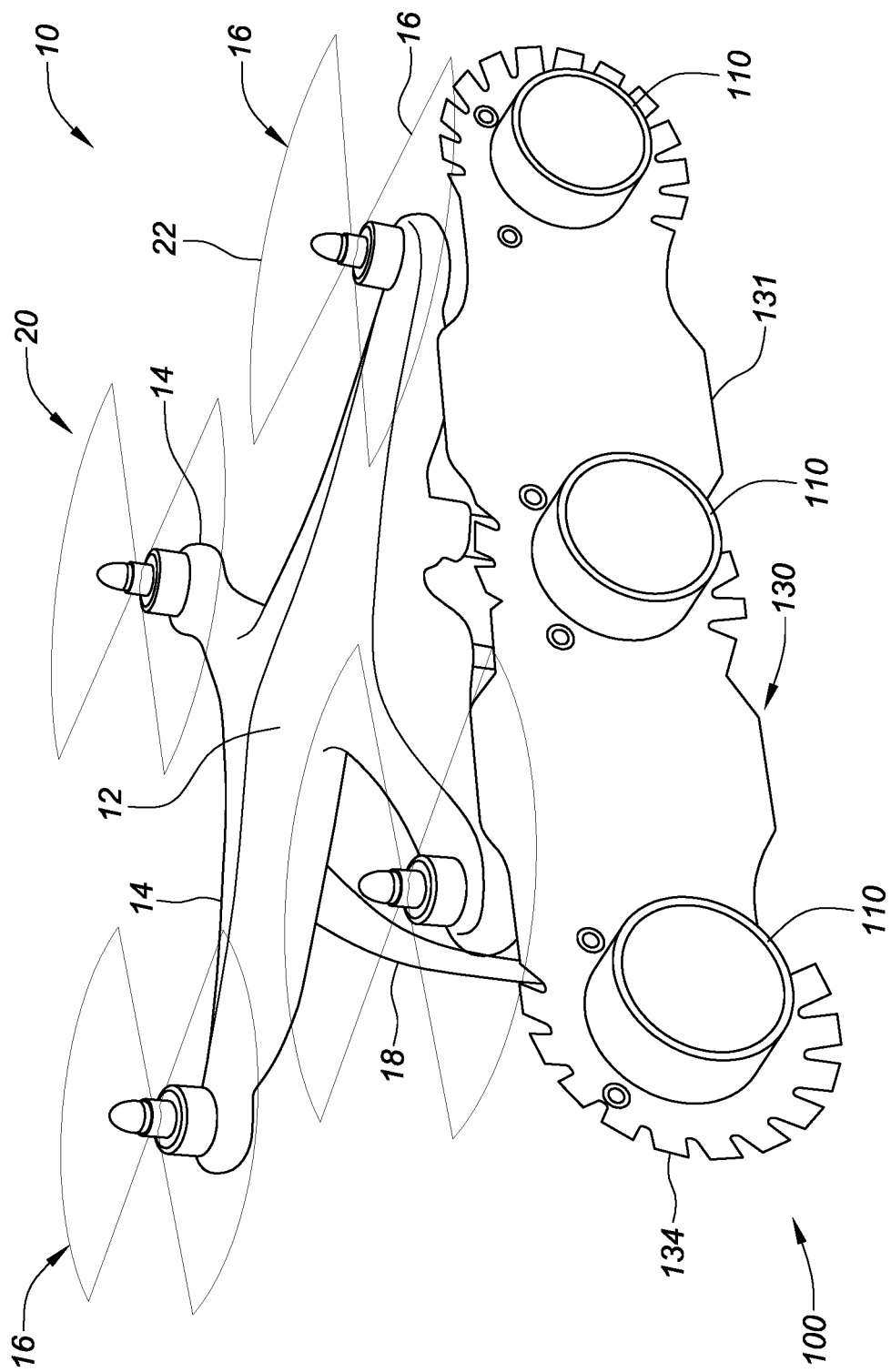
FIG. 1 shows a lighted UAV with a cooling system, where the UAV propellers are spinning and black, light-weight, finned housings radiate heat generated by the LEDs.

The following detailed description is not intended to limit the current invention, in that alternate embodiments will be apparent to those skilled in the art. For example, some of the lighting and cooling systems of the current invention may assume different configurations and may be fitted to different types of UAVs. Furthermore, one or more different types of lighting and/or cooling mechanisms may be used. In the figures, the same or similar reference numerals may refer to the same or similar elements throughout the different views, as well as within the description below.

The current invention addresses the significant and potentially debilitating heat that may be generated by today's high-lumen lights, such as LEDs and lasers. For example, in connection with LED testing in connection with the current invention, normal operation of a free-standing LED was observed up to a temperature of 85 degrees Celsius, which can provide 70% of the regular operational output of the LED, and which is rated to operate for up to 50,000 hours producing 3200 lumens. If the operator chooses to increase the amperage provided to the LED without employing an external cooling source, the LED will burn brighter, but the temperature will immediately increase into a range that reduces the lifespan of the LED. It is possible to increase the amperage to a level so great that the LED will glow almost three times as bright, but its lifespan will be very significantly reduced.

In order to avoid overheating the LED, to allow the LED to operate within desired temperature ranges and to avoid heat from the LED damaging other components, the current invention provides various cooling modes and mechanisms. For example as described later in connection with FIGS. 1, 4 and 5A-5E, in testing the three-LED assembly positioned below the spinning propellers of a one kilogram UAV, electrical current to the LEDs could be doubled when compared to a free-standing LED in still air, thereby producing 5,750 lumens for a continuous duty cycle. This was generally seen to be twice as bright as the uncooled LEDs, with no reduction in lifespan due to the combined cooling effects of the rotor prop wash, thermal transfer material, thin black aluminum plating and attached heat dissipating elements.

Referring now to FIGS. 1-4 and 5A-5E, embodiments of UAV 10, and lighting and cooling system 100, of the current invention are shown and described. An advantage of lighting and cooling system 100 is that it may be assembled as a unit and fitted to UAVs of different shapes and sizes made by various manufacturers. To this end, system 100 may be provided with UAV 10 or may be retrofitted thereto. For example, as shown in FIGS. 1-4, UAV 10 may include body 12, arms 14 (which extend outward and which support propellers 16) and downwardly-extending legs 18. With this UAV configuration, lighting and cooling system 100 may be attached to legs 18. Alternatively, system 100 may be attached to UAV body 12 by a bracket or other mounting device as discussed later.

In any event, the invention is not limited to the particular UAVs or UAV configurations shown in the figures. Furthermore, the invention is not limited to lighting and cooling systems that are assembled as a unit. Rather, certain components described below may be fitted to a UAV and still provide the lighting and cooling described herein.

Embodiments of lighting and cooling system 100 are now further described with reference to FIGS. 5A-5E, which show system 100 separated from UAV 10. In these embodiments, system 100 may include one or more lights or lighting assemblies 110 which may be mounted to light holding or cooling assembly 130, which may in turn be mounted to UAV 10. In this embodiment, lights 110 may be convection-cooled from the airflow of the prop wash created by propellers 16. Lights 110 may also be cooled through thermal conduction provided by cooling system 130 and/or heat absorption by dark surfaces of cooling system 130. For example, various components of cooling system 130 may be painted or coated black to increase heat absorption.

Lighting assemblies 110 may include LED or other light source 112, reflector 114 and lens 116 which may generally be assembled by and positioned relative to each other by housing, tube or can 118. In the right-most lighting location, in the rear exploded view on the right side of FIG. 5E, the rear side 112B of LED 112 is shown in line with the other components of light 110. To the right of rear side 112B, LED 112 has been turned around so that its front side 112A is visible as the actual light source 112C. LED 112 may be held in place by spacer 120 which may fit in lens tube 118. Reflector 116 may also fit in tube 118. In any event, these components are shown assembled into light assembly 110 in the middle lighting location, and light 110 is shown mounted to cooling assembly 130 in the left-most lighting location.

The amount of lumens provided by light(s) 110 may be selected to suit the application for which UAV 10 may be used. For example, a brighter LED 112 may be used where UAV 10 will be flown high off the ground, near significant light pollution and/or during daylight hours.

The profile of reflector 114 may also be chosen to provide a sufficiently focused or wide area beam. Furthermore, the length of housing 118 may allow different profiles of reflector 114 to be used to provide the desired lighting effect. Still further, housing 118 and reflector 114 may be coupled together, and housing 118 may be rotatable so that upon rotation, the axial position of reflector 114 relative to LED 112 may be varied to adjust the focus of the light provided.

Because different amounts of lumens may generate different levels of heat, the cooling aspect of system 100 may be adjusted to accommodate the desired level of lumens to be provided by light(s) 110. More specifically, various components of cooling system 100 may be adjusted to provide adequate cooling without excessive weight. The interplay between the lumen output and cooling capacity of system 100 is described in more detail below.

Figure 5A:
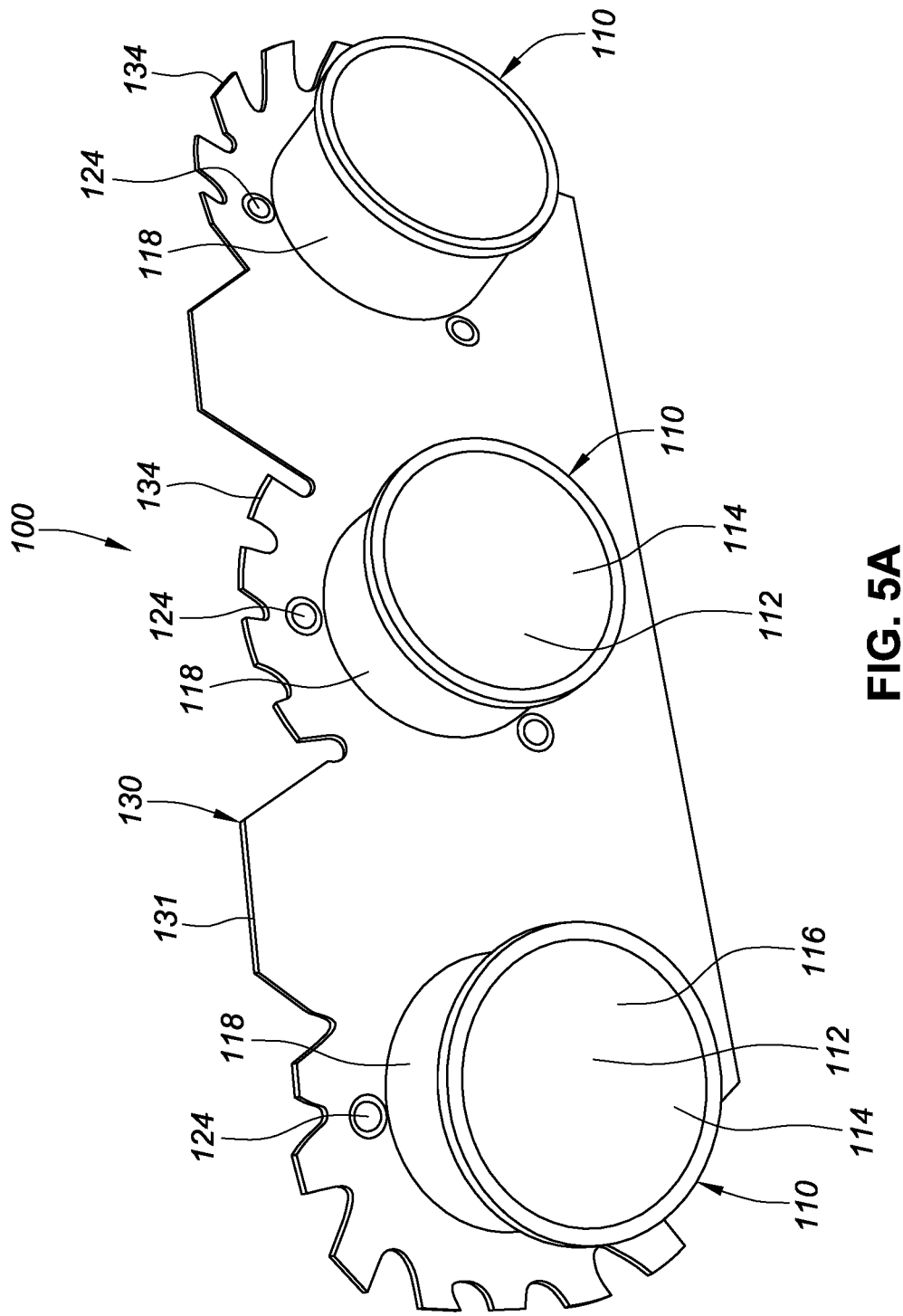
FIG. 5A is a front perspective view of a lighting and cooling system.
Figure 5B:
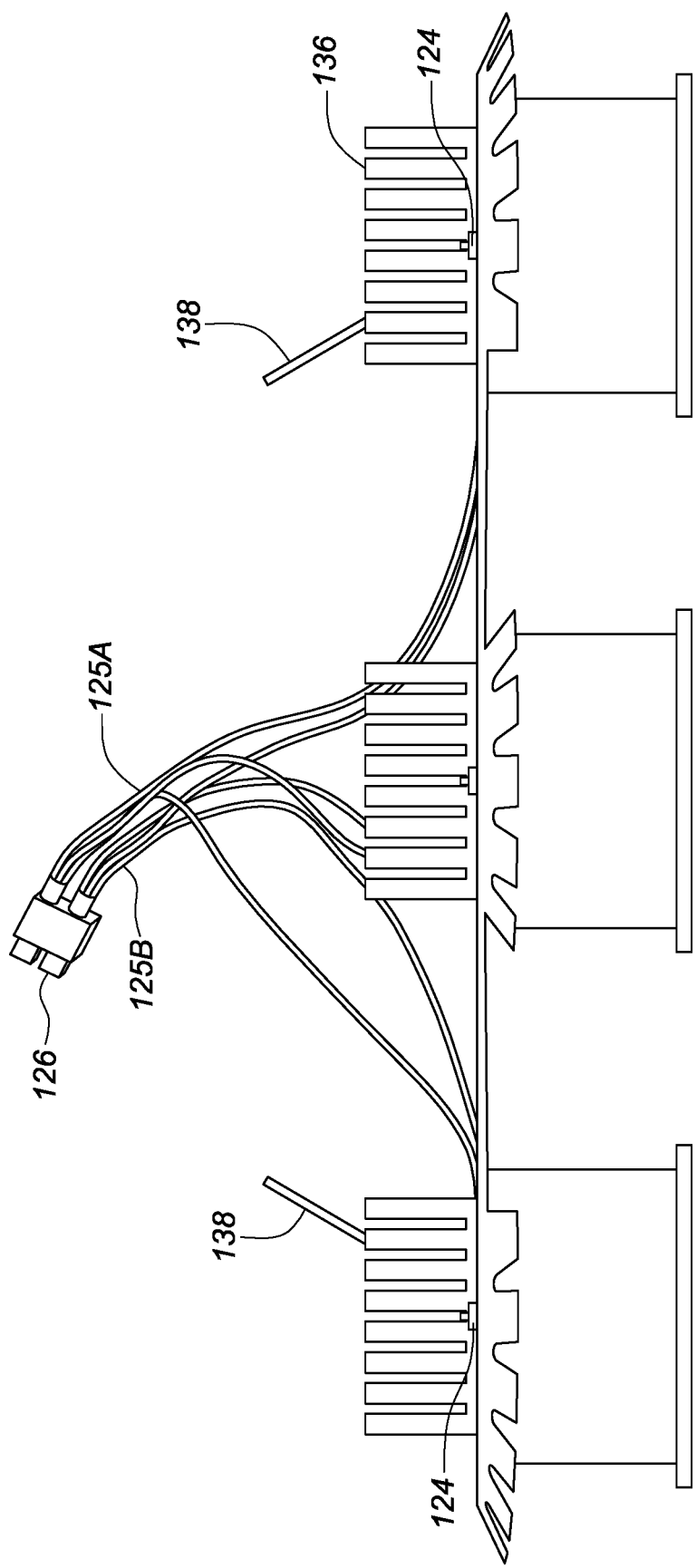
FIG. 5B is a top view of a lighting and cooling system.
Figure 5C:
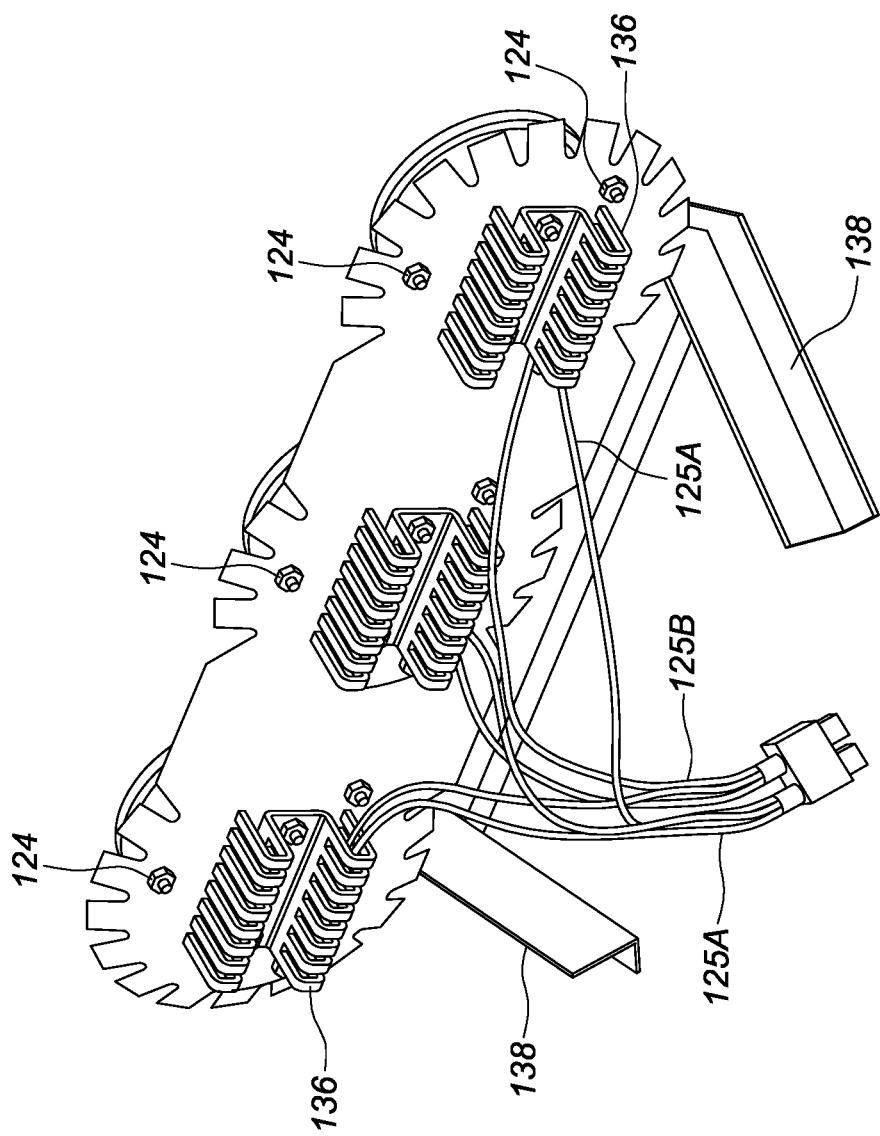
FIG. 5C is a rear perspective view of a lighting and cooling system.
Figure 5D:
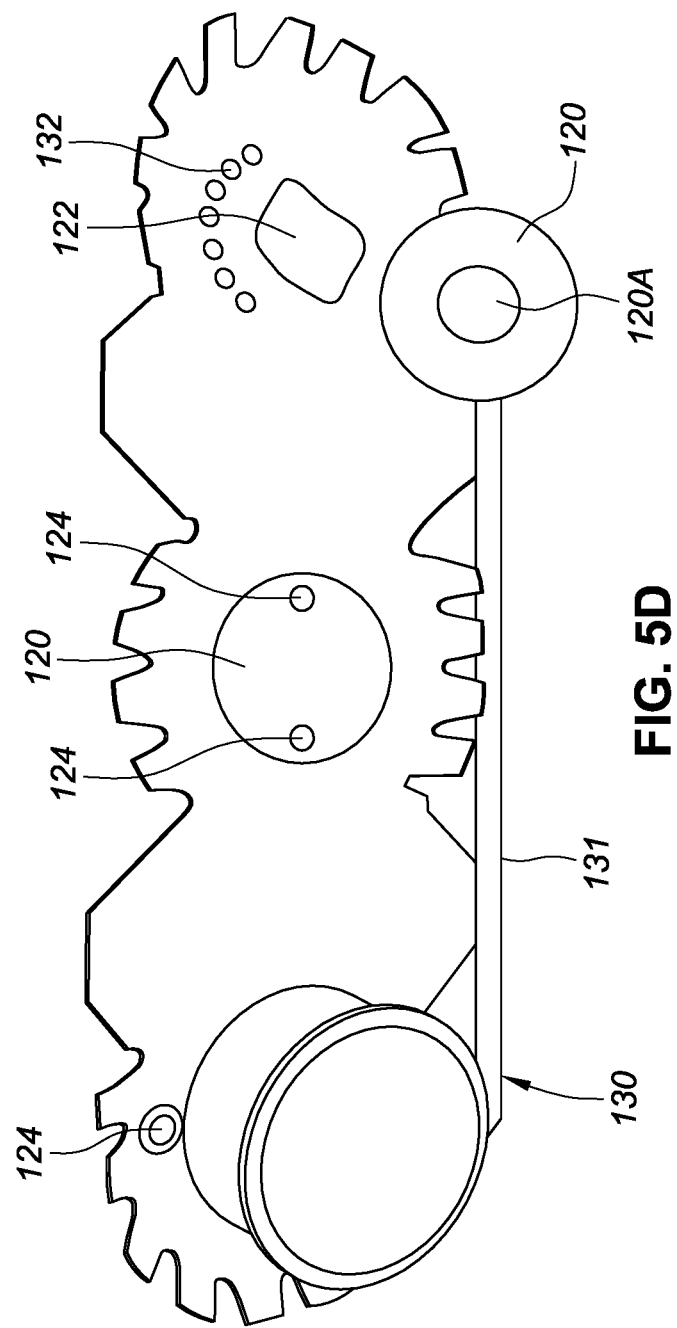
FIG. 5D is a front view of a lighting and cooling system with several components disassembled.
Figure 5E:
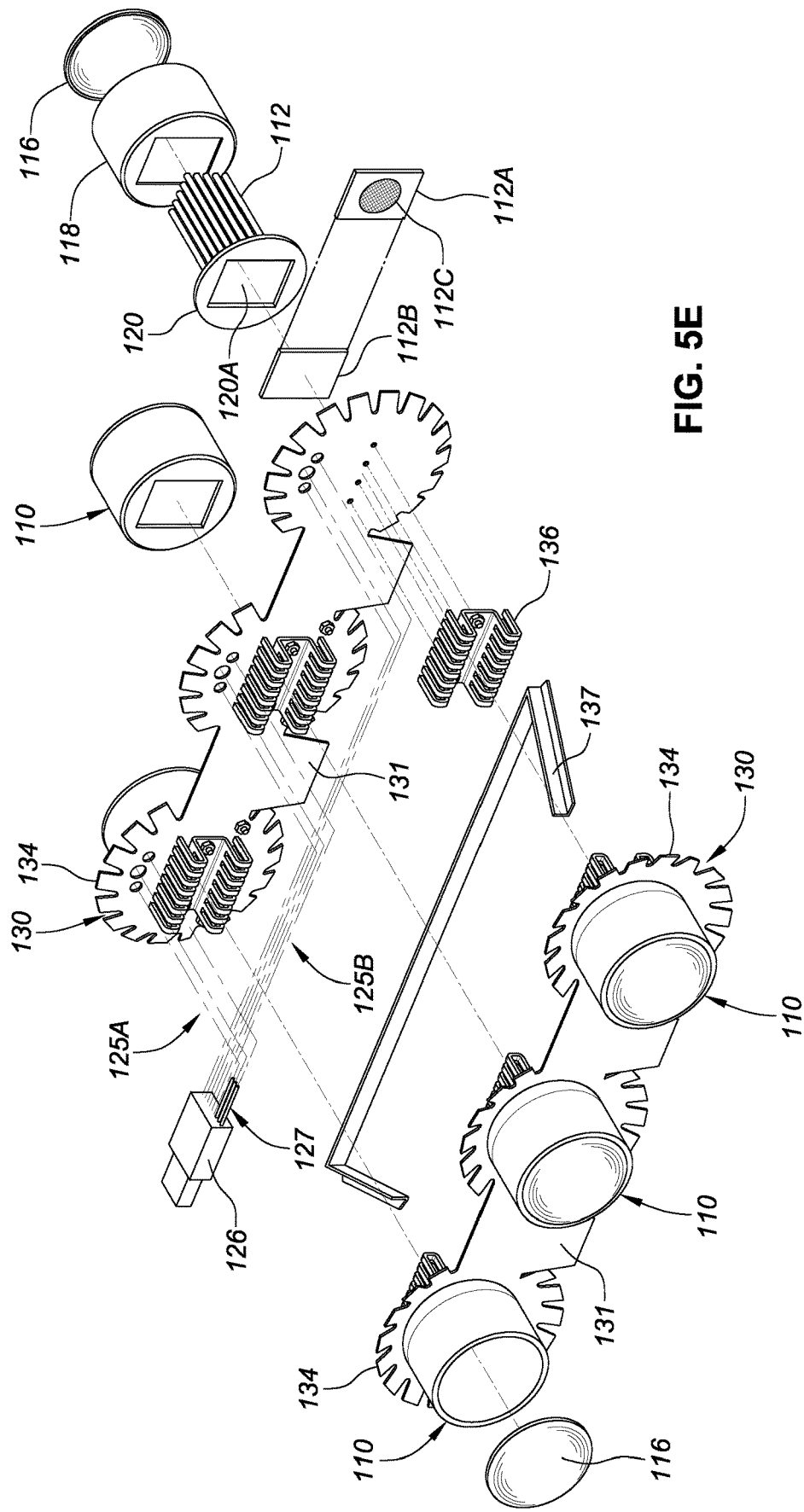
FIG. 5E is a combination front perspective view of three light assemblies, and a rear exploded assembly view of a lighting and cooling system. The front perspective view shows what the light assemblies may look like after the light assembly components in the rear exploded view have been assembled and turned around. The rear exploded view shows light assemblies in various states of assembly.

Light holder or cooling assembly 130 and the manner in which lights 110 may be attached thereto are now further described. Lights 110 may be mounted to plate, flange or holder 131 by bolts 124 or other suitable fasteners. FIGS. 5D and 5E show several light(s) 110 in different states of assembly in relation to plate 131. Referring to FIG. 5D, at the left end location, light 110 is shown fully assembled to plate 131 by fastener 124. In the middle location, the light has been removed to show spacer 120 that may be located between light 110 and plate 131. Spacer 120 may be held to plate 131 by bolts 124 or other suitable fasteners that may engage holes in plate 131. Spacer 120 is preferably non-electrically conductive so that the positive and ground leads 125A, 125B may contact LED 112 and not short out. Spacer 120 prevents the leads from contacting the conductive surface of housing 118 and provides conductive leads 125A, 125B to LED 112 itself. LED 112 may be located in hole 120A of spacer 120 and plate 131 to best provide heat conduction.

In the right end location, spacer 120 has been removed to show thermal paste 122 which may be applied on plate 131 at the location behind LED 112. Thermal paste 122 may comprise Arctic Silver or other similar thermal interface material for the conduction of heat from electronics carried by UAV 10. Thermal paste 122 is preferred because it provides good thermal conductivity between separate components.

The cooling through thermal conduction is now further described. Light assemblies 100 may provide cooling capability themselves. For example, housing(s) 118 may comprise aluminum or other thermally conductive material which may transfer heat away from LED 112 to the environment. Heat may also be conducted away from LED 112 through thermal paste 122 to plate 131 of cooling system 130.

Plate 131 and its cooling capabilities are now further described. It is preferred that plate 131 comprise a good thermal conductor so that it may conduct heat it receives from lights 110. For example, plate 131 may comprise aluminum, magnesium or other lightweight material that provides good thermal conduction.

Plate 131 may act as a heat sink and may include cooling fins 134 which may be positioned at various locations as shown. Fins 134 may be located at other locations as well. Plate 131 may also include holes or other shapes around its perimeter to increase the amount of surface area that interface with the environment to facilitate heat transfer thereto. Plate 131 may also include holes or louvers 132 that provide cooling.

Additional components that act as heat sinks may be attached to plate 131 on the side opposite lights 110 to provide additional cooling. As shown in FIGS. 5B, 5C and 5E, for example, bridges 136 may be mounted on the rear face of plate 131 at locations corresponding to lights 110. Bridges 136 may receive heat through thermal conduction and transfer it to the environment due to the increased surface area they provide.

Figure 2:
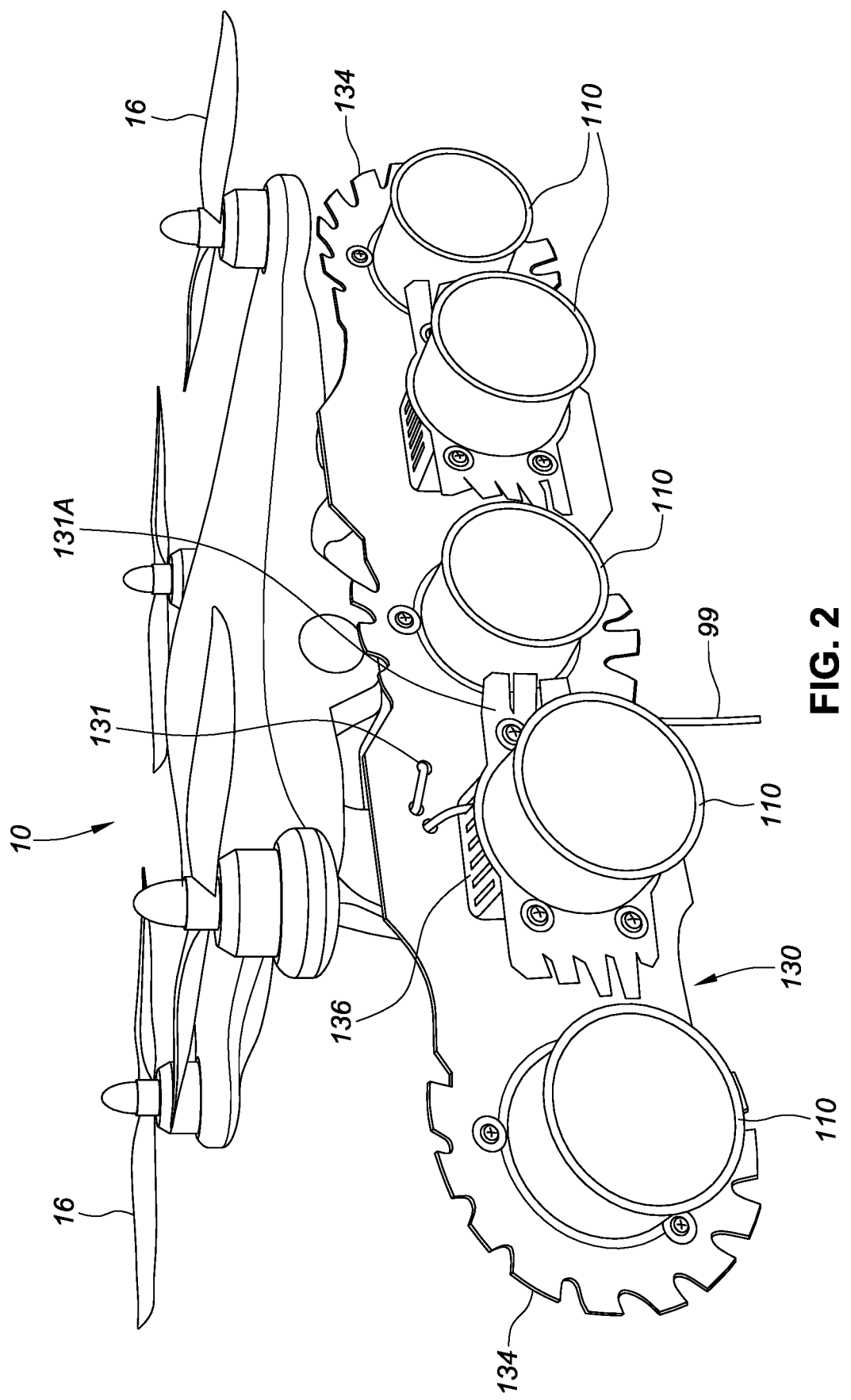
FIG. 2 shows a lighted UAV with a cooling system where the UAV propellers are at rest, and with an external power line or tether attached.

As shown in FIG. 2, bridges 136 may also be mounted to the front side of plate 131 in proximity of lights 110. As also shown in FIG. 2, additional cooling fins or cooling fin plates 131A may be mounted to light housings 118. Furthermore, the lights 110 may be positioned in a staggered fashion to put more space between the LEDs themselves. This is shown in FIG. 2 by the left-end, middle and right-end lights being mounted closer to plate 131 than the other two lights.

Figure 13:
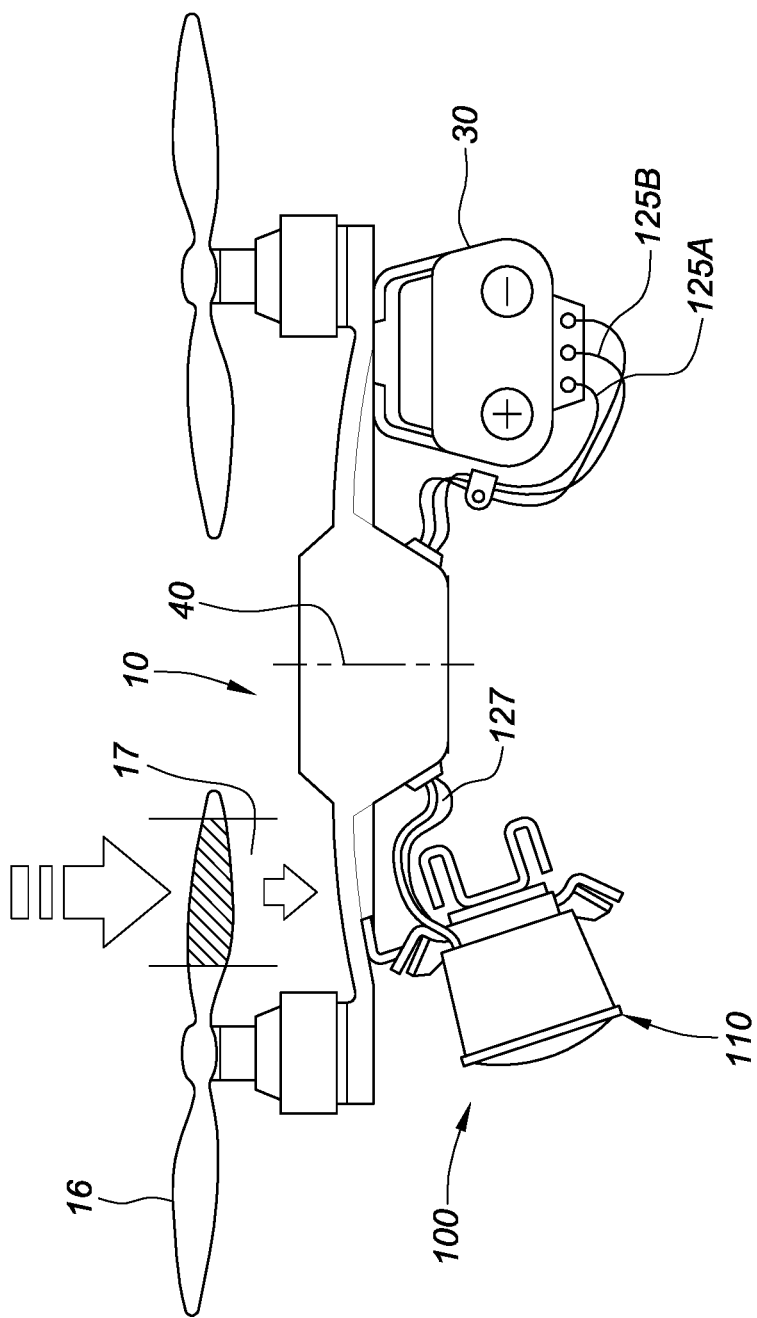
FIG. 13 is a side view of a UAV showing how a lighting and cooling system, and a battery or other power source may be positioned so that their respective weights counterbalance each other.

Referring now to FIGS. 5B, 5C, 5D and 13, the manner in which lights 110 may be electrically connected to power source 30 of UAV 10 is now further described. Positive electrical lines 125A and ground line 125B may electrically couple lights 110 to power source 30. Spacers 120 may accommodate the distal ends of lines 125A, 125B so that they electrically connect to the positive and ground contacts of LED 112. As shown in FIGS. 5B and 5C, lines 125A, 125B may extend through holes 132 of plate 131 and continue to the power source of UAV 10. To this end, lines 125A, 125B may travel along the outside of body 12 or may enter holes in body 12 and extend therein as shown in FIG. 13. Electrical lines 125A, 125B may be contained within wiring harness 127 and their ends proximal to the power source may be attached to plug 126 or other electrical connector 126. Plug 126 may be coupled to a corresponding outlet associated with the power source. As shown in FIG. 13, wiring harness 127 may extend so that lines 125A, 125B electrically connect to power source 30.

It is preferred that the battery or other power source and lighting and cooling system 100 be located so as to counterbalance each other. As shown in FIG. 13, lighting and cooling system 100 may be located on one side of UAV 10, e.g., the front of UAV 10, while the battery or other power source 30 may be located at an opposite side, e.g., the rear of body 12 of UAV 10. Furthermore, where system 100 has increased weight because it may include several lights 110 and associated cooling components, the power source may be located in a position extended rearwards from the body 12 of UAV 10 so that their respective weights may counterbalance each other to maintain the center of gravity of UAV 10 at or near its center so that it may fly controllably. To this end, the respective weights of lighting and cooling system 100, and of power source 30, may be compared so that they may be appropriately positioned relative to the center 40 of UAV 10. For example, if system 100 is generally the same weight as power source 30, they may be positioned generally equidistant from the center 40 of UAV 10. If lighting and cooling system 100 weighed more than power source 30, power source 30 may be positioned further away from the center 40 of UAV 10 so that the center of gravity of UAV 10 may be maintained at or near its center 40.

UAV 10 may be fitted with more than one lighting and cooling system 100. For example, systems 100 may be mounted to one, two, three or four sides of UAV 10, or some other number of sides if UAV 10 is not configured in a square-like fashion. And where UAV 10 may be shaped other than a square, additional lighting and cooling systems 100 may be fitted thereto. Where multiple systems 100 are fitted to UAV 10, it is preferred that they be mounted so as to counterbalance each other and/or any power source or other components. In this manner, UAV 10 may be balanced and fly more controllably and for longer durations.

Figure 3:
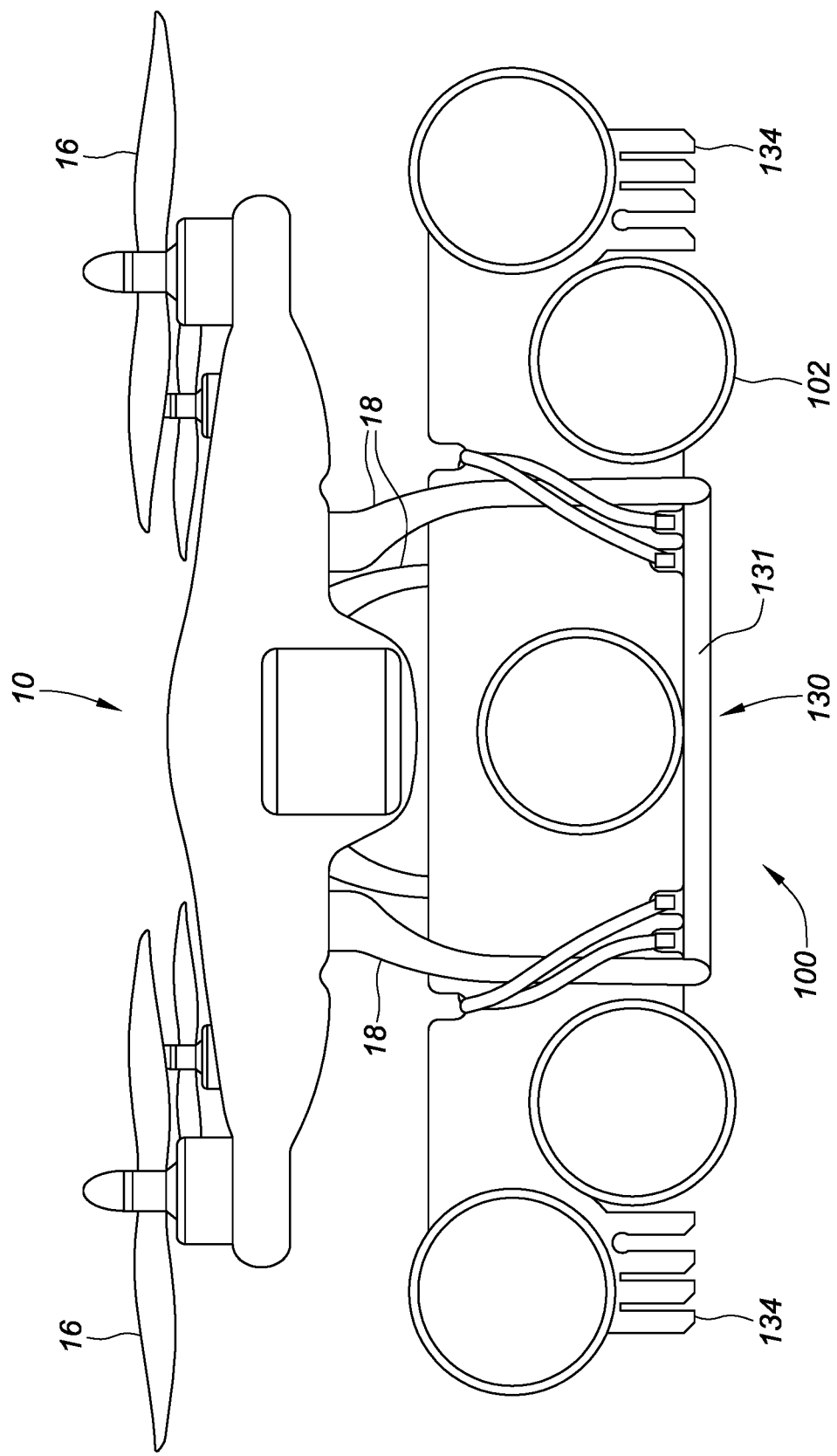
FIG. 3 is a front view of a lighted UAV including a cooling system.
Figure 4:
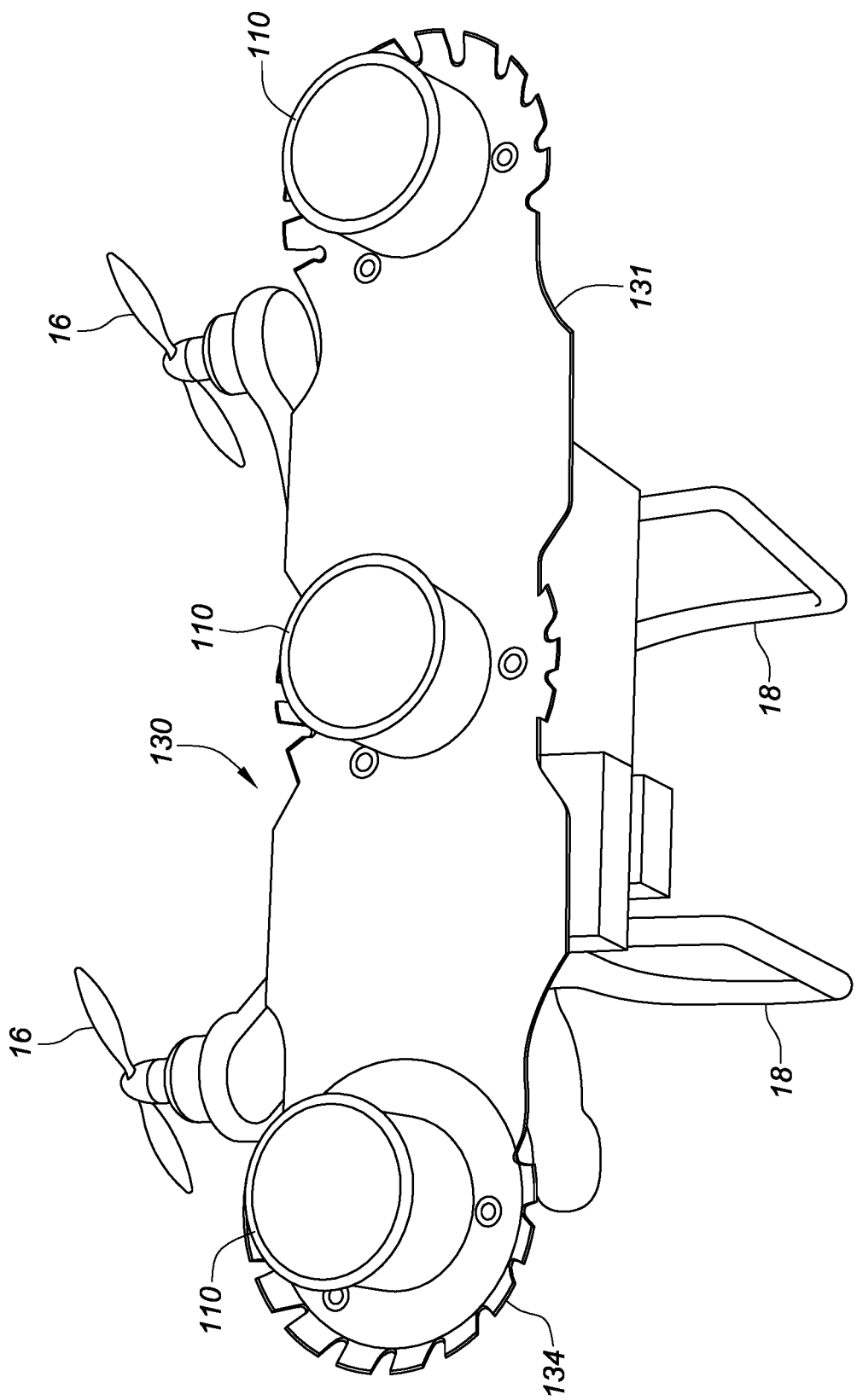
FIG. 4 shows a lighted UAV with a cooling system, where the UAV is in flight.

Plate 131 is now further described. The size and configuration of plate 131 may vary. For example, plate 131 may accommodate three lights as shown in FIGS. 1, 4 and 5A-5E, or five lights as shown in FIGS. 2 and 3. Other numbers of lights may be accommodated. Plate 131 may also include legs or mounts 138 that may attach cooling system 130 to UAV 10.

The thickness of plate 131 may be selected to provide the maximum surface area to volume ratio, thus providing maximum cooling and adequate strength to hold lights 110. By using a lightweight thermally conductive material, the weight that must be supported by propellers 16 during flight is also reduced and flight times extended. It is also preferred that plate 131 be colored black or some other dark color so that it may absorb heat through radiation.

Plate 131 is preferably configured so that lights 110 are positioned for convection cooling by the airflow of the prop wash created by propellers 16. To this end, lights 110 may be mounted to plate 131 at positions that are located under propellers 16. Because the amount of downward airflow created by propellers 16 is higher near the ends of the propeller blades, it is preferred that plate 131 locate lights 110 at these locations. More preferably, lights 110 are positioned to be below the outer third of the propeller blades, as shown in FIGS. 1-4 regardless of whether plate 131 is used to position them. In this manner, lights 100 may benefit from the increased airflow and cooling capacity provided by propellers 16 (as compared to the interior length of blades 16 near their center).

An advantage of cooling lights 110 with the downward airflow provided by propellers 16 is that this airflow serves multiple purposes. Besides the cooling described above, propellers 16 may generate the thrust to lift UAV 10 and keep it aloft, given that downward thrust is its primary source of lift. And beyond cooling lights 110 and providing thrust, the airflow provided by propellers 16 may be employed to cool spotlights, hot projector bulbs, electric motors or any similar appliance that generates heat during operation.

As with any flying vehicle where weight is an important issue, the fact that propellers 16 may serve multiple purposes for their given weight is a significant benefit. Indeed, as aircraft are desired to be low in mass and complexity, it is possible to utilize propellers 16 of UAV 10 to serve the dual purposes of both providing lift for UAV 10, and providing critical air movement over lights 110 and other electrical components carried aloft by positioning the components and/or cooling fins or tubes in the comparatively cool airstream generated by propellers 16. As such, the components of the lighting assemblies and cooling components may be arranged edgewise or similar to the airflow, to create an efficient compromise between cooling and allowing airflow from the propellers to provide lifting thrust for the aircraft.

The cooling and low mass provided by UAV 10 of the current invention is significant when considering that modern LED lights may sometimes operate only 30 seconds at a high output before melting. But where lights 110 are operated within the high volume airflow generated by propellers 16, and mounted on a heat-conducting surface such as plate 131 with cooling fins 134, a balanced output may be achieved that will allow a continuous duty cycle for the light while being carried aloft. In other words, the integrity of the electrical signals transmitted in connection with the lighting or other electrical functions provided by UAV 10 may be preserved, and restrictions in duty cycle that may occur in anticipation of excessive heating may be avoided.

The other electrical components noted above, such as motors and circuitry may be contained within UAV 10 and positioned to be below the propeller blades 16 to be cooled thereby. Electrical lines 125A, 125B may extend through brackets 137 to the body 12 of UAV 10, thereby coupling LED 112 to a power source within UAV 10. In embodiments where light 110 is centrally positioned as discussed below in connection with FIGS. 7-11, the battery or other power source of UAV 10 need not be located at an alternate position to provide counterbalancing. For example, the power source may also be centrally located within body 12 of UAV 10.

It is preferred that UAV 10 address a number of factors to achieve various goals. For example, the cooling provided by the current invention facilitates a balance for achieving a continuous duty cycle for lights 110 or other electrical components or appliances. That is, for the electrical systems of UAV 10 to achieve optimum performance, one must consider the relationship of adjusting the amps fed to lights 110 or other appliance, the surface area and heat conductivity of the device holding the appliance, the location of the appliance in the airstream of the UAV, and the gross weight of the UAV, which must generate sufficient thrust to achieve flight.

It is preferred that these components be carefully integrated to provide an adequate duty cycle of the appliance, while still allowing the aircraft to fly controllably. Cooling is improved by positioning the light, projector, winch or similar appliance in the airstream of propellers 16, and preferably downstream of the outer portions of propeller blades 16.

The interplay between the lumens provided by light(s) 110 and cooling system is now further described. There are various factors to consider, but as the amount of heat generated increases (generally in direct proportion to the level of lumens provided) cooling system 130 may be altered to provide adequate cooling. For example, the thickness of plate 131 may be increased to provide a heat sink larger capacity. The length and/or width of plate 131 may also be increased to provide a larger surface area from which to transfer heat to the environment. The size and/or number of bridges 136 may also increase to provide more cooling.

Beyond alterations to cooling system 130, propellers 16 may also be modified to provide more airflow if needed. To this end, the width and angle of propeller blades 16 may be adjusted to provide the desired amount of airflow and associated cooling.

A factor in altering the components that provide cooling relates to the overall weight of UAV 10. To this end, various components may be altered so that, in sum, adequate cooling is provided while not exceeding the weight which propellers 16 may hold aloft.

Figure 7:
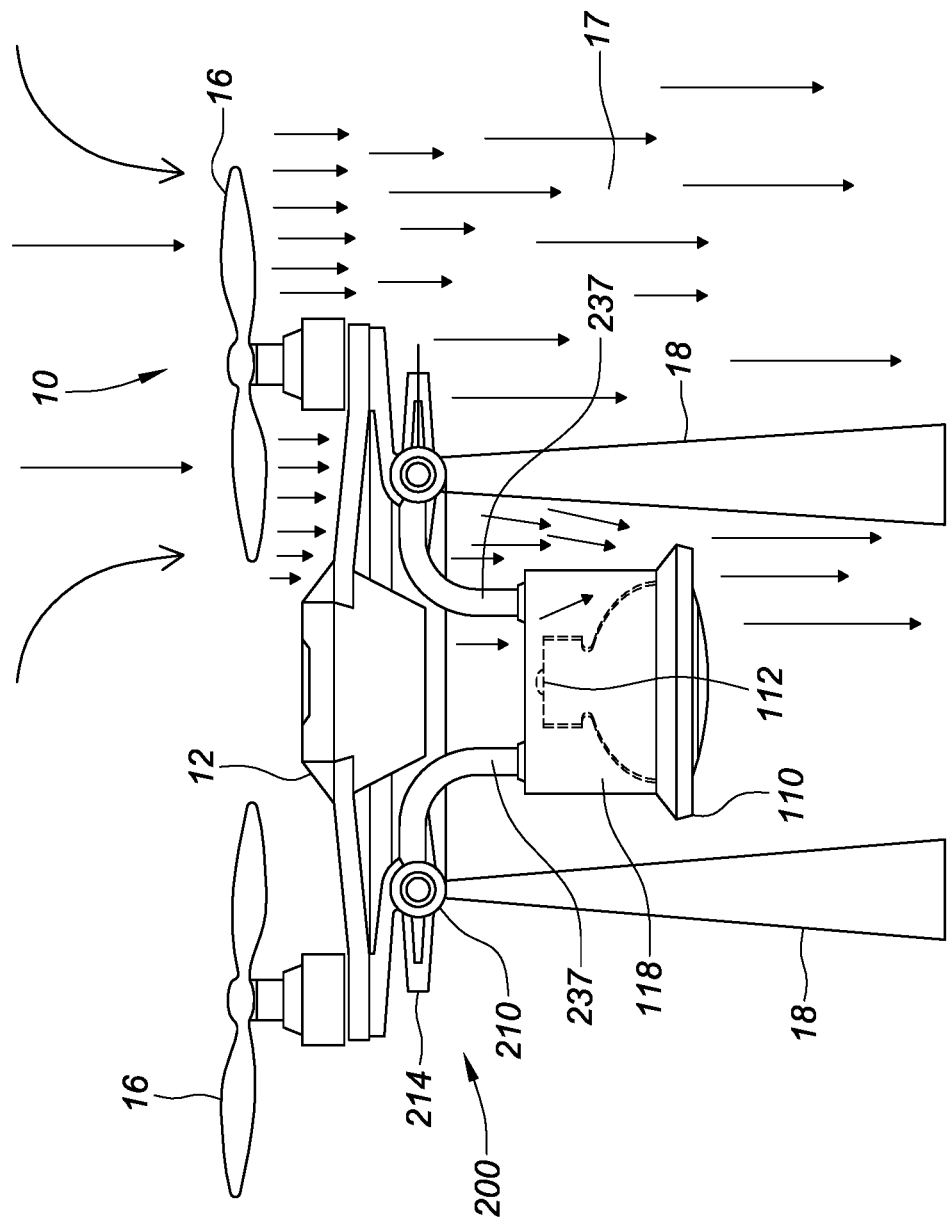
FIG. 7 is a section view of a lighted UAV showing prop wash airflow to cool the light.
Figure 8:
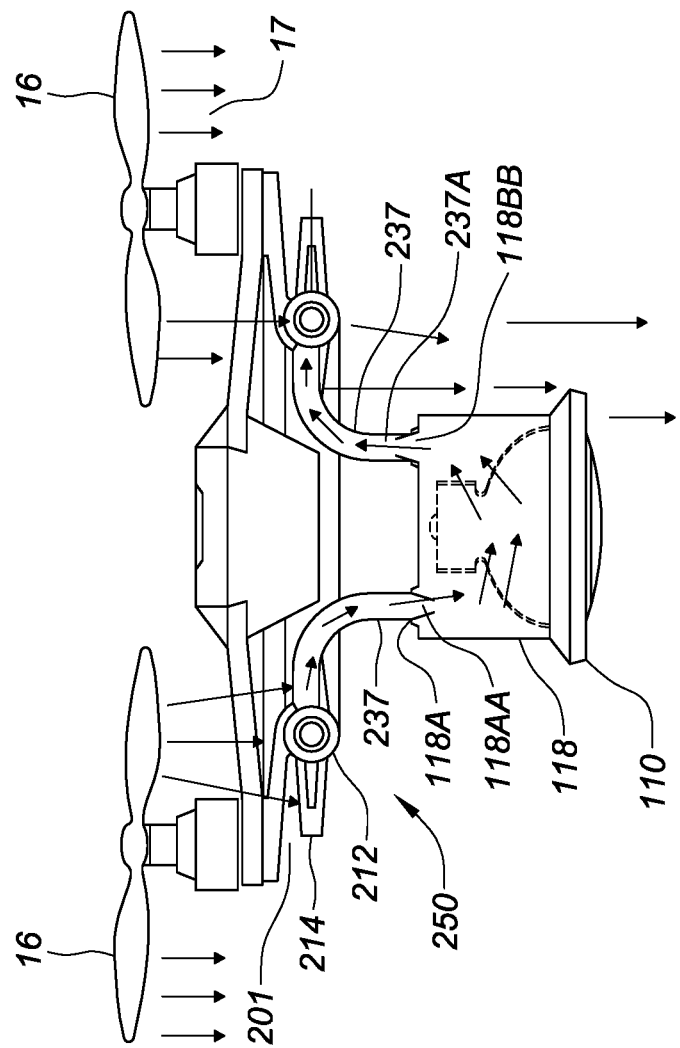
FIG. 8 is a section view of a lighted UAV having a liquid cooling system and showing airflow to cool the light.
Figure 8B:
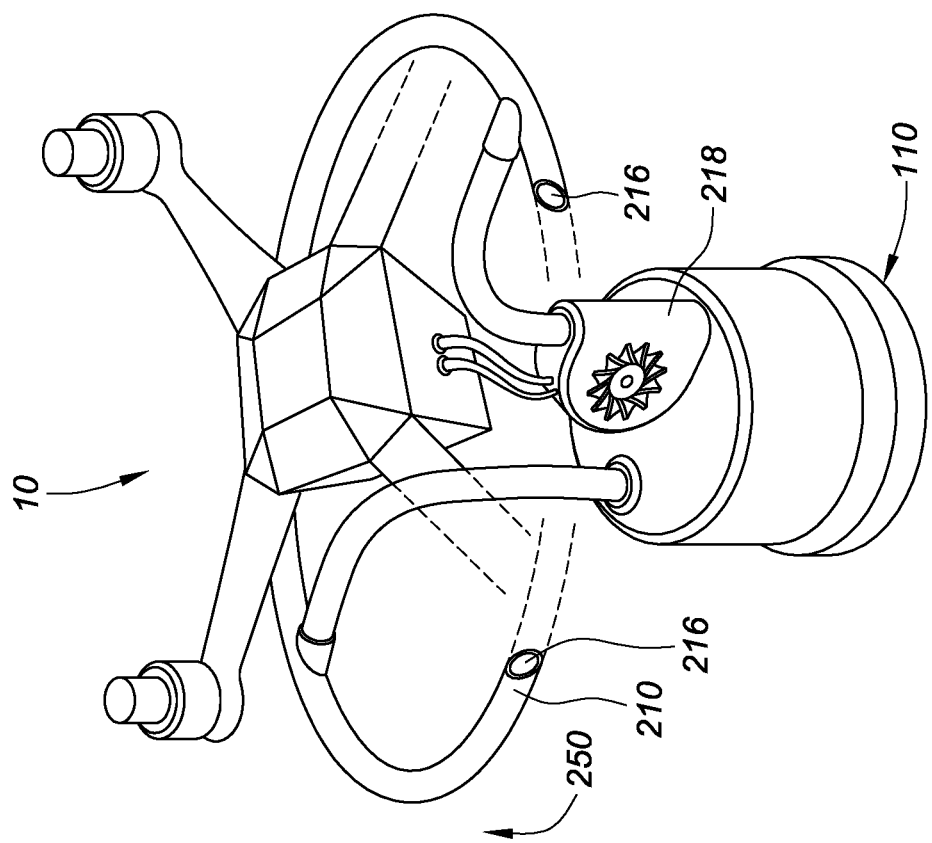
FIGS. 8A and 8B are section and perspective views of a UAV having a liquid cooling system that includes a pump to circulate the fluid.
Figure 8A:
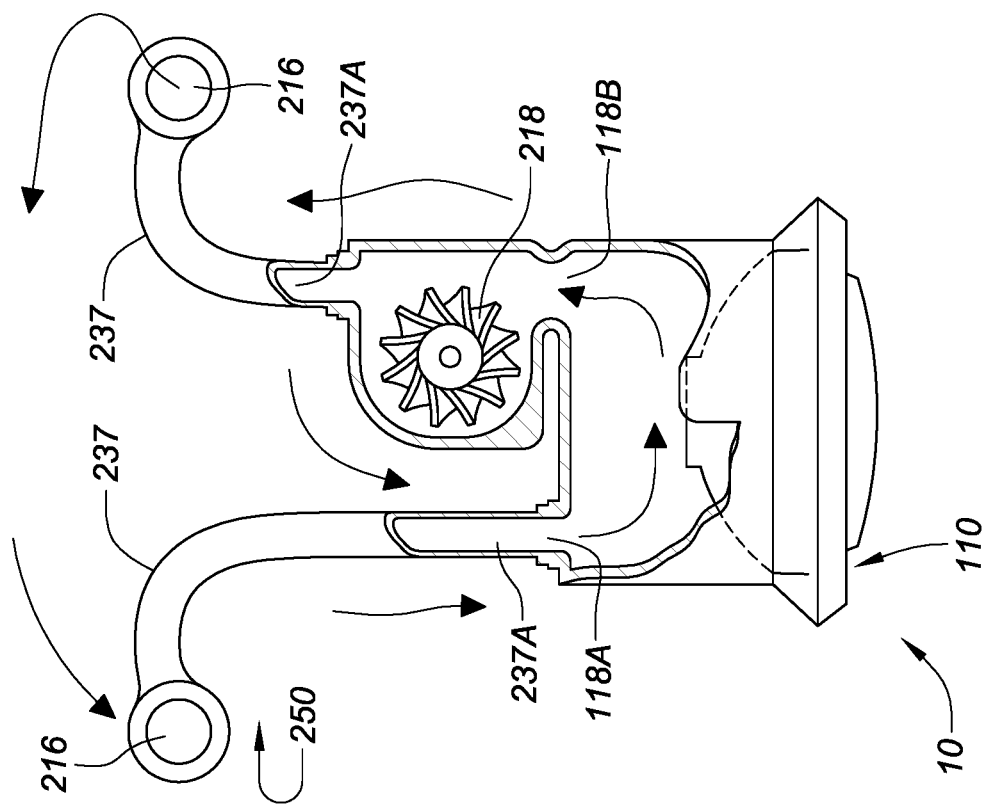
Figure 9:
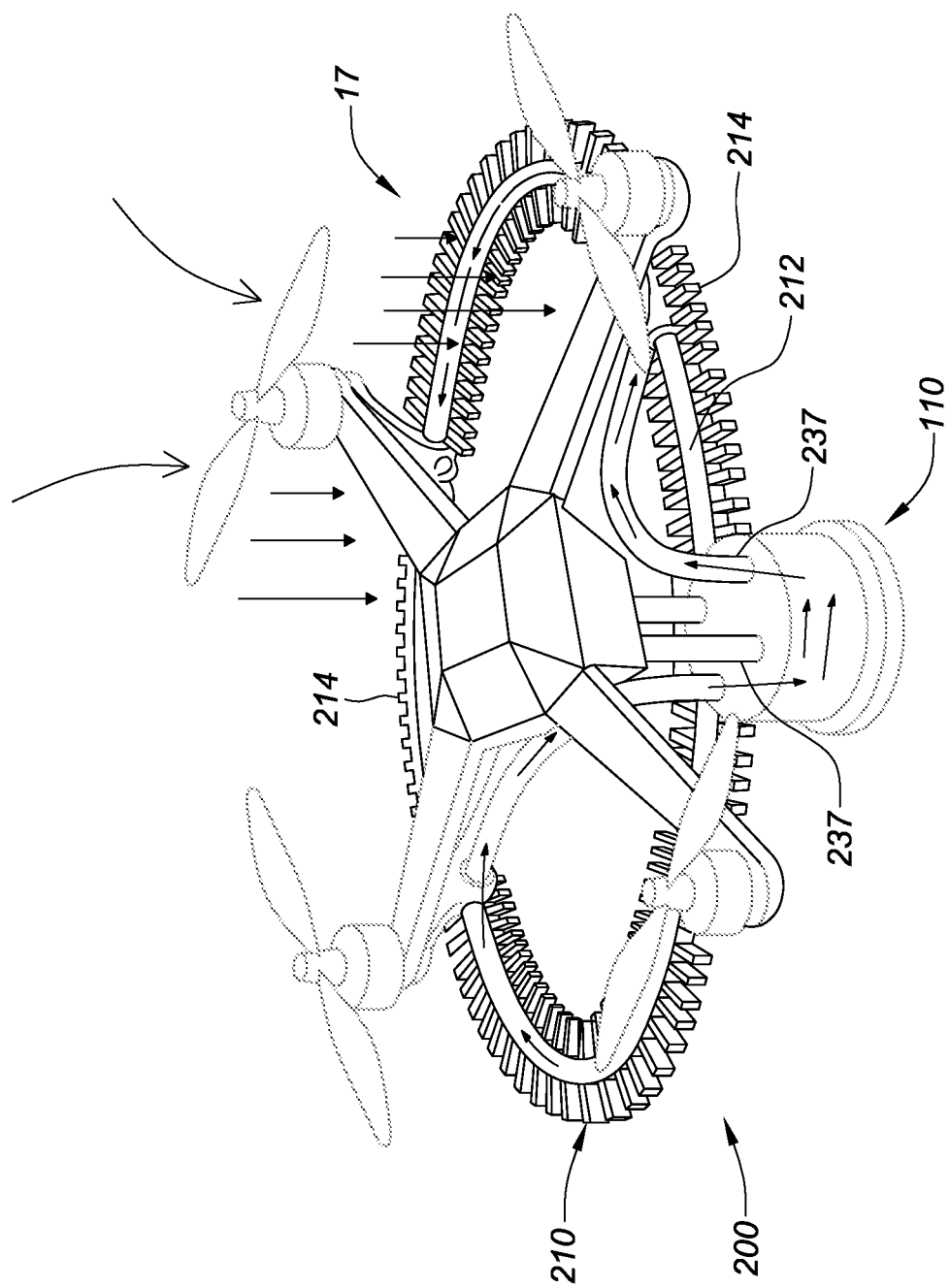
FIG. 9 is a top perspective view of a lighted UAV showing the cooling of a light by prop wash and liquid cooling.

Additional types of cooling by convection provided by the airflow of propellers 16, as well as additional types of heat transfer by conduction, are now further described in connection with an alternate embodiment of UAV 10 shown in FIGS. 7 and 9. FIG. 9 is a perspective view of this embodiment of UAV 10, and FIG. 7 is a section view thereof. (It should be noted that FIG. 9 also describes another embodiment involving an internal liquid cooling system as shown in FIGS. 8, 8A and 8B discussed below. However, FIG. 9 is also applicable to the convection and conduction modes of cooling now described.)

The embodiment of FIGS. 7 and 9 includes one light assembly 110 positioned underneath the middle of UAV 10 and attached thereto by brackets 237. However, other numbers of lights 110 may be used lighting and cooling system 100 as described above may be attached to UAV, e.g., attached to legs 18, and be cooled from the airflow as discussed below. In any event, where one centrally located light is used, the power source or other components need not be repositioned because the center of gravity is not disturbed by light 110.

FIGS. 7 and 9 show the airflow pattern 17 provided by one of the propellers 16. As noted above, it is preferred that light 110 be located at a position that is beneath the outer part of the propeller blades 16, where airflow is increased. In the embodiment of FIGS. 7 and 9, UAV 10 is a quadcopter having four propellers, so light 110 preferably benefits from the increased airflow provided by the outer portions of four sets of propeller blades 16. That is, light 110 may be centrally located below UAV 10 and thus be positioned below the outer portions of the propeller blades 16.

This embodiment may also include radiator cooling system 200. In the embodiment shown, radiator cooling system 200 may comprise ring 210 that may generally extend around the center of gravity of UAV 10 so as to provide for equal weight distribution and that may include housing 212 and a number of cooling fins 214. Housing 212 may include a hollow internal passageway 216 to be used for an internal cooling system as discussed below. In any event, with radiator system 200, light 110 may also be cooled through conduction as follows.

Light housing 18, brackets 237 and radiator 200 may all be thermally connected. Accordingly, heat generated by LED 112 may be conducted through light housing 18, then through brackets 237 and then to and through radiator 200. Beyond the foregoing components acting as heat sinks for thermal conduction, they may also transfer heat to the environment. To this end, radiator housing 212 may include a number of cooling fins 214 which provide significant surface area for transferring heat to the environment.

Radiator 200 is preferably located so that it too is in the path of the airflow 17 generated by propellers 16 thereby increasing its capacity to act as a heat sink. And as shown in FIGS. 7 and 9, radiator 200 is preferably positioned so that it is located below the outer portions of the propeller blades 16 so that it is in the path of maximum airflow. The heat exchanger or radiator 200 may be constructed of aluminum, magnesium or other thermally conductive and light weight metal. Fins 214 are preferably positioned perpendicular to the airflow, thus providing maximum surface area in the airflow of the copter, while minimizing drag on the flight of UAV 10.

Another embodiment of UAV 10 which includes liquid or fluid cooling system 250 is now further described with reference to FIGS. 8, 8A, 8B and 9. FIGS. 8B and 9 are perspective views of UAV 10, and FIGS. 8 and 8A are section views thereof. Liquid cooling system 250 may be similar to radiation cooling system 200 of FIG. 7, but in this embodiment, ring 210 includes internal passageway or channel 216 through which cooling fluid may circulate. The addition of liquid cooling to the cooling provided by the convection from the propeller airflow 17 and thermal conduction discussed above, enhances the overall cooling capacity of UAV 10 for cooling lights 110, and any other number of heat generating or heat sensitive items, such as projectors, electric motors, winches, and other appliances.

As discussed below, liquid cooling system 250 may act as a radiator similar to the radiator system 200 discussed above in connection with FIG. 7. In this embodiment, however, heat carried by the circulating fluid is transferred to ring housing 212 and cooling fins 214, which then transfer this heat to the environment. The fluid may be circulated by pump 218. In this manner, as the fluid passes by light 110, or any other heat generating component, the fluid is preferably cool such that it may receive heat from light 110. This heated fluid then circulates through radiator 210 and is cooled by the heat it loses to ring housing 212 and cooling fins 214, so that when fluid again passes by light 110, it is cool enough to receive more heat. It is preferred that pump 218 be located and sized so as to avoid disrupting the center of gravity of UAV 10.

In the embodiment shown in FIG. 8, brackets 237 may be used to couple light 110 to the liquid cooling radiator system 250. More specifically, brackets 237 may themselves contain internal passageways or channels 237A that communicate with the internal channel 216 of ring 210. One or more of these internal channels 237A may enter light housing 118 through inlets 118A and may leave light housing 118 through outlets 118B. To this end, housing 118, or some portion thereof, may be filled with circulating fluid. Fluid may enter light housing 218 and pass closely by the heat-generating LED 112 to enhance heat transfer. To ensure that the liquid circulates in the desired direction, inlet 118A and outlet 118B may include one-way or check valves 118AA, 118BB that allow the liquid to pass through in only the desired direction.

Where legs 237 include internal passageways 237A, they advantageously provide multiple functions at a given weight contribution to the overall weight of UAV 10. In current UAVs, legs, such as legs 237, typically operate to help in land the UAV 10 and/or avoid a camera hung from the bottom of the UAV from hitting the ground. In the current invention, however, legs 237 function to hold light 110 and to help cool it. Furthermore, legs 237 may be extended beyond the bottom surface of light 110 to provide a landing capability. That multiple functions may be provided by a component allows UAV 10 to provide increased capability at a given weight.

It is preferred that liquid cooling be used to address certain situations, such as where the size of light 110 or other electrical appliance placed in the airstream 17 of propeller 16 is too small to provide adequate surface area to be cooled by the airflow 17. Without adequate cooling, the light or other appliance may overheat which may in turn cause damage or disrupt the duty cycle of electrical signals causing the appliance to not perform properly.

For example, modern LED lights and their associated packaging may be very small and still create a focused light beam that is capable of lighting wood on fire. The significant heat generated by such intense LEDs requires constant cooling to avoid damaging the LED or surrounding components or causing the UAV to crash and burn. Where the LED is packaged in a small format, a cool stream of airflow 17 may not provide sufficient cooling. So in this situation, liquid cooling system 250 may be used to rapidly draw heat from the LED and transfer that heat to a heat exchanger such as liquid cooling system 250 which preferably has a surface area much greater than the packaging in which the LED is contained.

Liquid cooling system 250 preferably accounts for the density and concentration of the heat generated by LED 112, the need for rapid heat transfer away from LED 112 to avoid overheating or other damage, and the high thermal coefficient of water or similar liquids for being able to move that heat away from LED 112. As noted above, the liquid heated by light 110 may then be recycled by circulating it through ring radiator system 250 and returned in a cool state LED 112 for additional passes and cooling.

In another embodiment involving liquid cooling, passive heat pipes may be used for cooling lights, projectors or other appliances attached to multicopters or similar UAVs during both ground and flight operations. In this embodiment, the internal channel comprising channels 216, 237A may be filled with fluid, e.g., ammonia or alcohol (methanol), to transfer heat through heat exchanger 200 and away from light 110. In this manner, light 110 or other electrical appliances may be cooled with a semi passive liquid in thermally conductive pipes.

In another embodiment not shown in the figures, a cooling liquid may be held by a reservoir and passed by light 110 or other heat generating component. Thereafter, the heated liquid may simply be discarded. However, a continuous loop approach such as cooling system 250 is preferred because carrying a single-use liquid aloft would provide limited cooling duration, and would require refilling for reuse.

In another embodiment that may involve the liquid cooling of FIG. 8, while UAV 10 is not in flight, it may float on the surface of a pond like a lilly pad with light 110 submerged. In this situation, light 110 may be switched on, and cool water pumped in for cooling, with the warm water generated pumped back in to the lake where internal channel 216 would include an inlet hole to receive water and internal channel 237A would include an outlet hole to send warm water overboard. One-way valves may be used for the water inlet and outlet. Additionally, this method of pumping cool water through or by lamp 110 may be employed when light 110 is mounted on top of UAV 10 in free air, with the copter acting as a floating platform. In this case, light 110 may be gimbaled and controlled by an active system to point lights 110, or simply have its light beam pointed by motors, propellers, and control systems located on the supporting UAV.

The heat exchanger or radiator of liquid cooling system 250 may be constructed of aluminum, magnesium or other thermally conductive and light weight metal. Fins 214 may be configured to be perpendicular to airflow 17, thus providing maximum surface area in the airflow of the copter, while minimizing drag on the flight of UAV 10.

Figure 10:
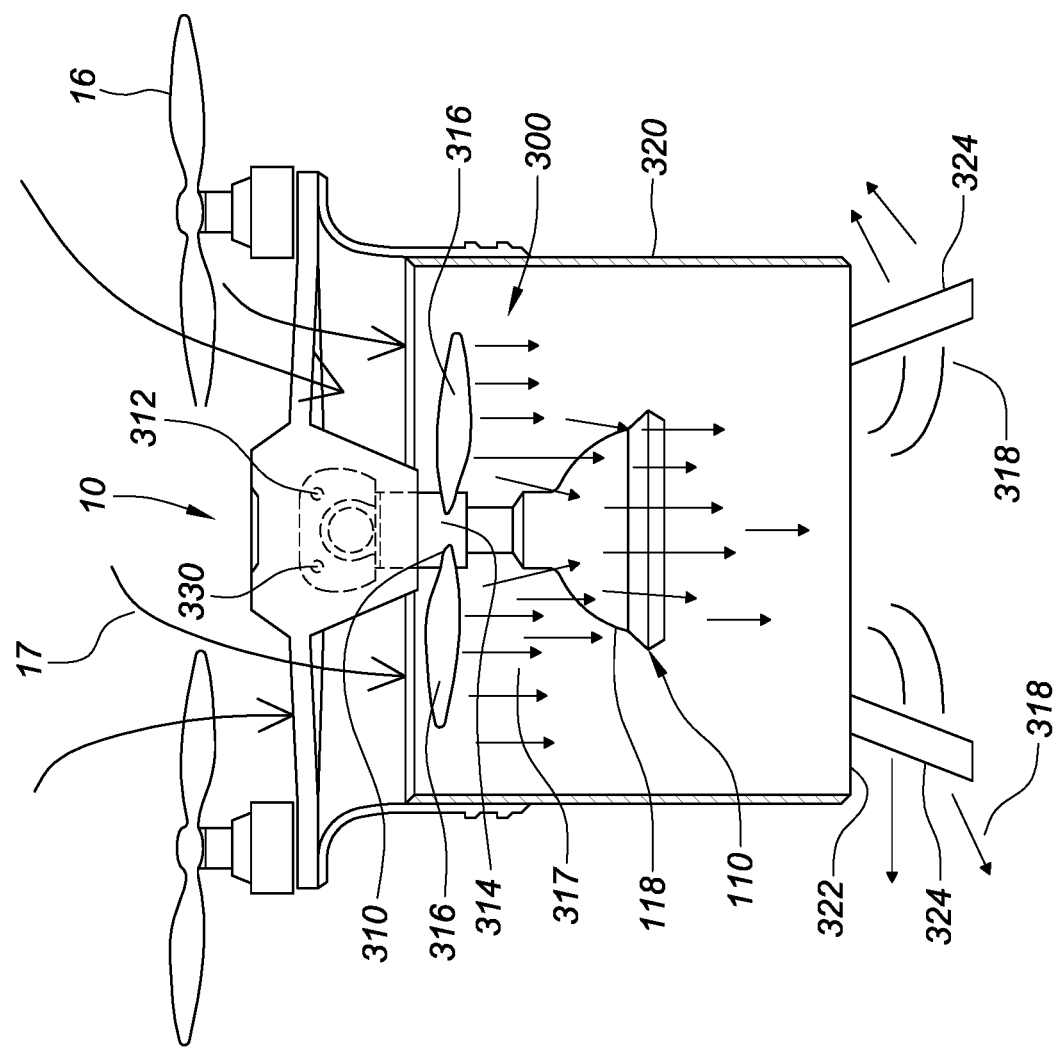
FIG. 10 is a section view of a lighted UAV including a dedicated cooling fan to cool the light.

Referring now to FIG. 10, a cooling system including a dedicated cooling fan is now described. As shown, UAV 10 may include dedicated cooling fan system 300. As with other embodiment discussed above, UAV 10 may include light 110 mounted on its underside and at or near its center of gravity. Dedicated cooling fan system 300 may include dedicated fan 310 which may in turn include propellers 316 which provide dedicated airflow 317 when they spin. System 300 may also include motor 312 that may be mounted within body 12 of UAV 10. Alternatively, motor 312 may be mounted to the underside of body 12 which may facilitate air cooling thereof. Motor 312 engages and spins axle 314 on which fan 310 may spin. As shown in FIG. 10, it is preferred that propeller 316 be located above light 110 to maximize the cooling provided airflow 317.

In this embodiment, UAV 10 may include shroud 320 which may comprise, e.g., a cylinder that extends downward from UAV 10 and may conclude with opening 322 at its bottom end. Shroud 320 may allow airflow 317 to be directed to light 110 in a more focused manner since airflow 317 is contained by shroud 320 and does not become diffused.

Legs 324 may extend downward from shroud 320 and may provide landing capability. Legs 324 may also provide a gap between the ground or other landing surface, and the bottom of shroud 320. Where fan 310 is spinning while UAV 10 is not flying, this gap may provide an exhaust means for air 318 after it is directed downward below light 110. As such, heated air 318 may escape to aid in cooling light 110.

Though FIG. 10 shows a single light 110, this embodiment of UAV 10 may be fitted with multiple lights that may be cooled by fan 310. Alternatively, multiple dedicated cooling fan systems 300 may be mounted to cool one or more lights 110. Regardless of the number of dedicated cooling fan systems 300 and/or lights 110 used, it is preferred that they be mounted to maintain the center of gravity of UAV 10 so that UAV 10 may fly smoothly.

Beyond cooling light(s) 110, dedicated fans 310 may also be used to cool other heat generating or heat sensitive components or appliances that may be mounted to UAV 10. To this end, UAV 10 may include multiple cooling fans 310 some of which may direct air downward, but others which may direct air upward to cool electronics or other appliances that may be housed within body 12 of UAV 10. Where any fans 310 are designed to direct air upward, it is preferred that any such upward airflow not be so significant to create difficulty in main propellers 16 lifting UAV 10 and maintaining it aloft.

A benefit of dedicated cooling fan system 300 is that it may provide cooling while main propellers 16 are turned off or on. Accordingly, even while UAV 10 is sitting on the ground with main propellers 16 off or at reduced RPM, thereby providing little or no airflow convection cooling, dedicated cooling fan 310 may provide cooling to light(s) 110. And as noted above, heated air 318 may exhaust out from within shroud 320.

This may be advantageous when, for example, shortly after UAV 10 lands and propellers 16 slow down or stop, light(s) 110 are still very hot and need cooling. As another example, UAV 10 may be flown to a perch as part of its intended flight plan and then remain there for some period of time so that propellers 16 slow down or turn off. In this case, it may still be desired to operate light(s) 110 and dedicated fan 310 may continue to cool them. Fan 310 may also operate while UAV 10 flies, thereby providing airflow 317 cooling in addition to the airflow 17 cooling provided by propellers 16.

To this end, it may be preferred that the body of shroud 320 be held above the landing surface by legs 324 that allow the hot air 318 generated by the appliance to be exhausted outward, thus providing improved airflow. Conversely, if the function of the propeller is to blow cooling air upward, the gap at the base between shroud 320 and the landing surface may allow cool air to enter the chamber to be pumped upward over UAV 10.

It should be noted that lightweight still and movie cameras such as the Go Pro Mini Hero are the most common electrical payloads carried aloft by existing UAVs. Such components rarely need any substantial cooling, unlike the high intensity lights 110 of the current invention. However, existing cameras are typically located as close as practicable to the center of gravity of UAV 10 to avoid causing an imbalance condition that would reduce the flight and controllability performance of UAV 10 without restricting the view of the camera's subject by a part of the aircraft.

Similarly, light 110 with its associated cooling components may also need to be located as close as practically to the center of UAV 10 to maintain controllability. As such, dedicated cooling system 300 is preferably mounted to UAV 10, so that even if a camera or other appliance is also fitted to UAV 10, the overall center of gravity is not significantly disturbed. To this end, dedicated cooling system 300 may include cooling fins and/or liquid cooling fluids such as those described above in connection with cooling systems 200, 250, and if so, these additional components are preferably mounted to UAV 10 so as not to significantly disturb the center of gravity.

Figure 11:
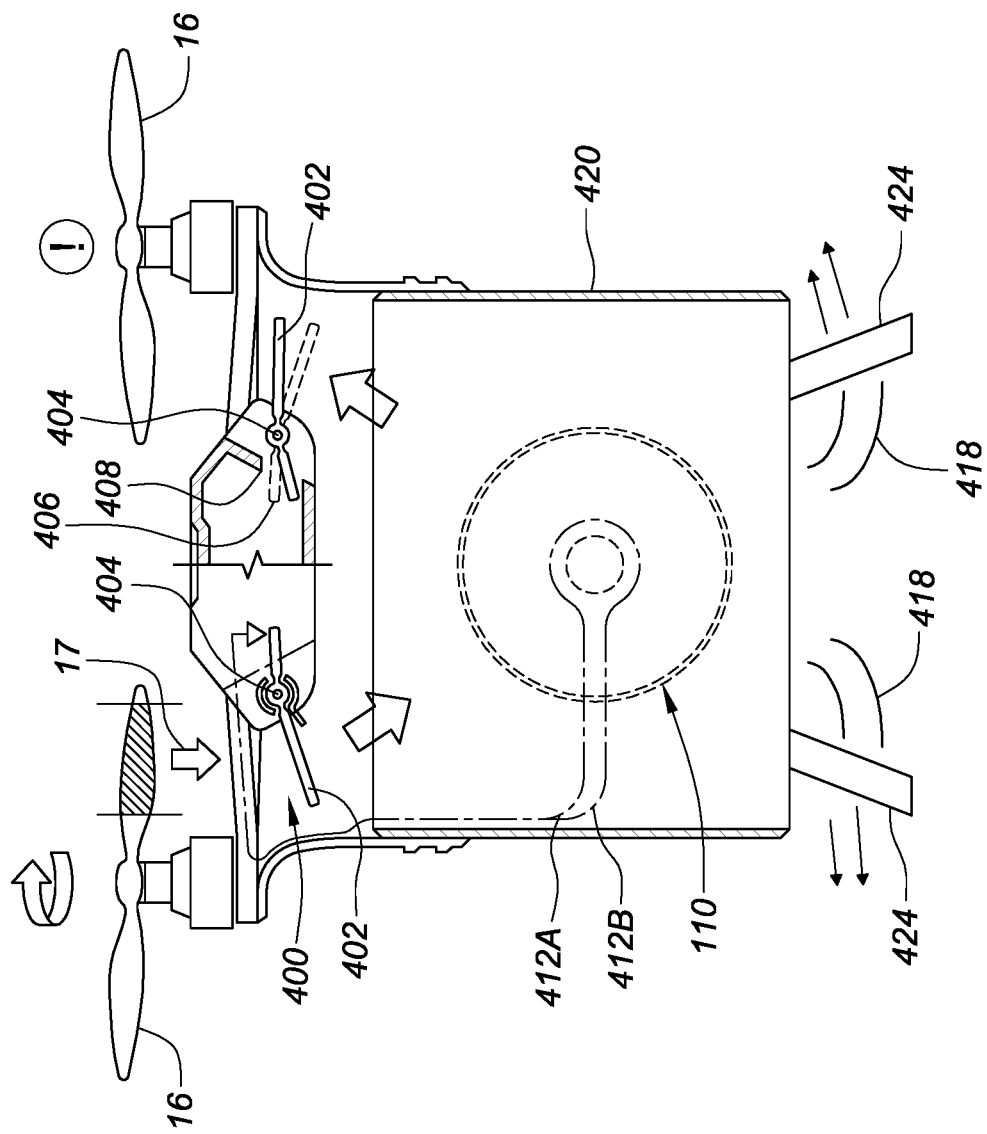
FIG. 11 is a partial section view of a lighted UAV including a light switch that is turned on by prop wash airflow. The partial section view is shown by the right hand side of the drawing.

Referring now to FIG. 11, another embodiment of cooling the lighting that may be fitted to UAV 10 is now described. In this embodiment, light 110 may be turned on by a switch system 400 that is activated when propellers 16 spin thereby providing airflow 17. Switch system 400 may include paddle(s) 402 that may be mounted to body 12 of UAV 10. Paddle(s) 402 may be mounted on pivot(s) 404 which may in turn include a spring or other biasing mechanism that forces paddle 402 in an up position as shown in right hand side of FIG. 11. When paddle 402 is in an up position, the switch 406 of system 400 is open and light 110 does not turn on.

When propellers 16 start spinning and create downward airflow 17, however, paddle(s) 402 may be pushed downward by airflow 17. When in the down position, paddle(s) 402 may close switch 406 by having the inward end of paddle(s) 402 touch electrical contact 408 as shown in the partial section view and ghost representation of paddle 402 on the right hand side of FIG. 11. When closed, the electrical circuit to light 110 may be completed. To this end, the circuit may include positive and ground lines 412A, 412B connecting switch 406 and light 110.

The left side of FIG. 11 shows switch 406 in a closed position because airflow 17 pushes paddle 402 down. The right side of FIG. 11 shows switch 406 in an open position because airflow 17 has stopped and the biasing mechanism forces paddle 402 to its up position thereby opening switch 406.

The spring or other biasing mechanism may be set for different amounts of force to allow it to close and turn on light(s) 110. Accordingly, the biasing mechanism may be set to close switch 402 with a lower amount of force that may reflect the lower airflow 17 existing when propellers 16 are just starting up. Alternatively, a higher amount of force may be selected to ensure that propellers 16 are spinning at their flight speed so that enough airflow 17 is provided for sufficient cooling. As another alternative, switch 406 may include a delay so that light(s) 110 do not come on for a desired amount of time after paddles 402 are pushed downward to close switch 406. In this manner, an additional safeguard against overheating may be provided.

Cooling system 400 provides the benefit that light(s) 110 may not turn on until propellers 16 are spinning and airflow 17 is provided. In this manner, light(s) 110 are not in a position to overheat due to lack of airflow cooling. This may be a significant benefit given that current high power LEDs may generate significant heat in a very short period of time. And without adequate cooling, this heat could damage the LED, other components or UAV 10 itself.

Similar to the dedicated fan embodiment of FIG. 10, the embodiment of FIG. 11 may include shroud 420 that may contain the downward airflow so that it is more focused in its cooling capability. Also, the bottom of shroud 420 may be spaced above the ground when UAV 10 is not flying by legs 424. This gap allows heated air 418 to exhaust their helping the cooling of light 110.

In an alternative embodiment shown in FIGS. 12A, 12B, 12C, UAV 10 may include a probe system 500 that may turn a light on or off depending on whether UAV 10 is sufficiently off the ground at a time when the airflow from propellers 16 is available to provide cooling. In general, probe system 500 may include probe 510 and spring 512 that is positioned between floor 514A and ceiling 514B. Spring 512 may be positioned so that it coils around probe 510, and engages probe shelf 510A. Spring 512 may be biased so as to exert a downward force on probe shelf 510A (and thus probe 510). When UAV is airborne, UAV 10 may include shroud 520 that may extend downward from UAV 10. Shroud 520 may include floor 514A and ceiling 514B that may extend inwardly.

As shown in FIG. 12B, while UAV 10 is off the ground 515, probe 510 may exist in an extended position due to the downward bias provided by spring 512. Probe 510 may comprise a rod having foot or pad 513, and may extend through hole 515 in the bottom of UAV 10 or a bottom surface of shroud 520. Spring 512 may reside between floor 514A and ceiling 514B which hold it in place. Spring 512 may coil around probe 510. Probe 510 may continue axially upward above spring 512 as shown.

At or near its upper end, probe 510 may include electrical bridge 519. When probe 510 is in the extended position of FIG. 12B, it is being forced downward by spring 512 and may position electrical bridge 519 to make contact with positive and ground lines 525A, 525B that are connected to a light carried by UAV 10. This connection may serve as a switch to close the circuit and turn a light carried by UAV 10 on. In this manner, the light(s) 110 may not turn on until UAV 10 is flying meaning that propellers 16 are spinning to provide sufficient airflow 17 to adequately cool light(s) 110.

Upon landing as shown in FIG. 12C, probe 510 will be pressed upward against the bias of spring 512 due to the weight of UAV 10 resting on the ground 515. When this occurs, electrical bridge 519 also moves upward thereby losing contact with one of the electrical lines 525 to open the switch thereby turning off light(s) 110. In this case, propellers 16 may continue to spin for some time after landing, thereby providing cooling even after light(s) 110 have been turned off.

It is preferred that the vertical travel of UAV 10 when spring 512 compresses is such that gap 530 remains between the ground and UAV 10 when in a landed position. Gap 530 provides an exhaust for heated airflow or an intake for ambient air if the airflow is directed upward as discussed below.

FIG. 12A shows probe system 500 in UAV 10 on the ground 515 such that probe 510 is in its retracted position, spring 512 is compressed and electrical bridge 519 is in an open position and light(s) 110 are turned off. In this situation, it is preferred that the gap 521 between the bottom of shroud 520 and ground 515 allows for the exhaust of heated air, or the intake of cool ambient air.

More specifically, gap 521 provides an exhaust path when propellers 16 spin in their normal downward airflow 17A operation. Alternatively, the gap may provide an inlet for cool ambient air where propellers 16 spin in the other direction thereby creating upward airflow 17B and a suction through gap 521.

As such, FIG. 12A is split with the right side showing cooling flow when propellers 16 of UAV 10 are spinning in lift mode, and the left side depicting flow if propellers 16 are functionally reversed; thus drawing air upward through shroud 420.

It should be noted that current UAVs typically do not generally have a reverse function for propeller blades 16 to blow air upward. Accordingly, this is a benefit of the current invention. To provide this capability, the motors powering propellers 16 may be capable of spinning propellers 16 in two directions. Having the ability to reverse propeller blades 16 for cooling of lights 110 on the ground has at least the following advantages.

First, the natural flow or heat rising off light 110 may be amplified by pulling cooling air up from the bottom rather than forcing it down from the top, thus requiring less energy and better wicking of heat because hot air is not blown off the top of the appliance back down and over the bulb 110 once again.

Second, in the application of an outdoor display where wind currents may be gusty, the profile of UAVs 10 with shroud 520 may get knocked over or slid sideways from their parked positions while waiting to take off for a show. This may be very disruptive to the performance, e.g., the GPS locations of UAVs 10 would need to keep up with their new locations and they would scramble back to their flight positions on takeoff, likely causing collisions. Accordingly, the utility of reversing the direction of propeller blades 16 not only cools lights 110, but also presses UAV 10 downward on the ground, thus increasing stability of the parked UAV 10.

Without the ability to spin propellers 16 to create upward airflow 17B, spinning blades 16 blowing downward airflow 17A as is their normal function to cool the lamp 110 in gusty conditions may increase the problem of instability as propellers 16 would create some amount of lift and thus reduce the friction and weight of UAVs 10 on the ground. In sum, spinning propellers 16 backward would increase stability and cool the lamp while UAV 10 is on the ground 515.

Where UAV 10 includes a tether to provide power for flight, running propellers 16 while on the ground 515 would have no effect on the flight time of UAV 10. Alternately, if UAV 10 is battery powered as traditionally done, using blades 16 to provide a firmly parked condition or cooling may reduce flight time as power is used on the ground.

Figure 6:
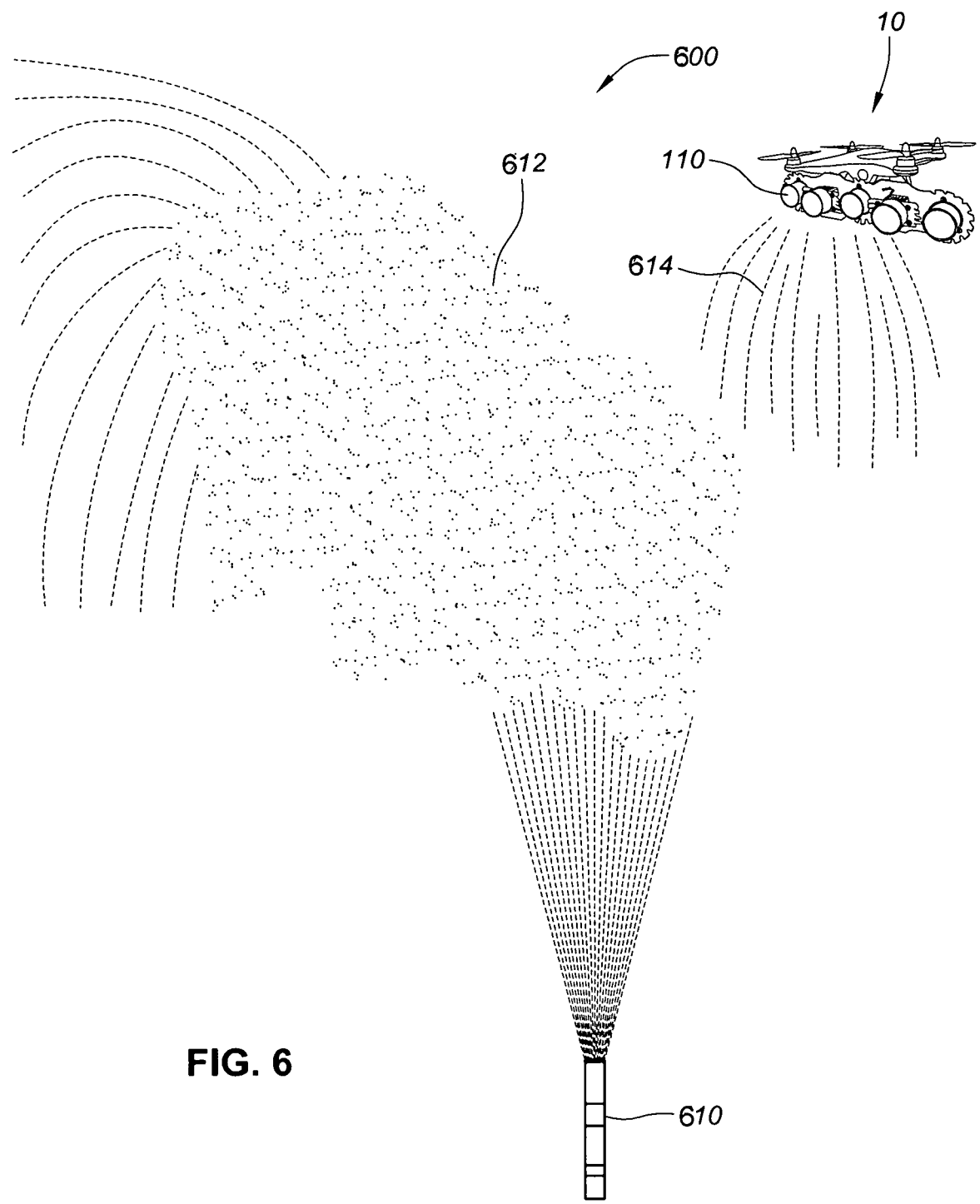
FIG. 6 shows a lighted UAV in flight near a water display and its lights illuminating the water.

The cooling of lighted UAVs in connection with water and lighting displays is now described. Starting with the world-famous fountains in front of the Bellagio Hotel in Las Vegas, water and lighting displays have become increasingly complex and visually amazing. UAVs may be used in such displays to provide innovative and unique enhancements to their visual effects. For example, UAVs may be used to lift and aim lights at streams of water as shown in FIG. 6. There, display 600 includes water nozzle 610 that shoots out a stream of water 612. As shown in FIG. 6, stream 612 may be shaped as a fan. UAV 10 may be flown so that its lights 110 illuminate water stream 612 to provide a dramatic visual effect. Lights 110 may also illuminate water as it falls back down to the ground. In FIG. 6, this is shown by water droplets 614 being illuminated, providing another visual effect.

It should be noted that current water and lighting displays already use very powerful lights such as those shining up from the reservoir containing the water that feeds the water shooters. Because of the brightness of this lighting, any light to be provided by a UAV would need to be similarly bright or be washed out and/or not discernible by observers. Because such lights generate significant heat, any lighted UAV 10 participating in water and lighting displays would need cooling such as discussed above.

However, beyond the convection, conduction and/or radiation cooling discussed above, the lighting of UAV 10 may also be cooled by the water from the fountain or other type of water display. To this end, standing pools or water streams created by fountains or similar water features may provide cooling to light 110, or other heat generating components such as projector bulbs, or appliances carried by UAV 10.

For example, UAV 10 may be flown along the trajectory of the water stream provided by a water shooter and/or downward from the apex of the water stream's trajectory. In this manner, the water stream may touch or come near UAV 10 to provide cooling for light assemblies 110, radiator 200, 250 or other heat generating components of the light. A balanced rod may project from the copter to position the light in the water stream. Alternately, the UAV could hover or fly along above the surface of a lake with a lamp hanging on a wire below it, submerged and glowing to "paint" light on the water's surface, with the water providing all the necessary cooling.

The cooling of lights UAVs 10 in connection with water and light displays may also occur by submerging UAV 10 in a body of water. Many water and lighting displays typically include a pool or reservoir that serves as the source of water for the water shooters comprising the display. UAV 10 may be programmed to fly down and into the pool. While submerged, the water may receive heat from the light housings 118, radiator 200, 250 and any other heated surface of UAV 10. Furthermore, the circulation of pool water as discussed above may be used for cooling. The submerging and reemerging of UAVs 10 may also comprise part of the lighting portion of the overall display.

Figure 14:
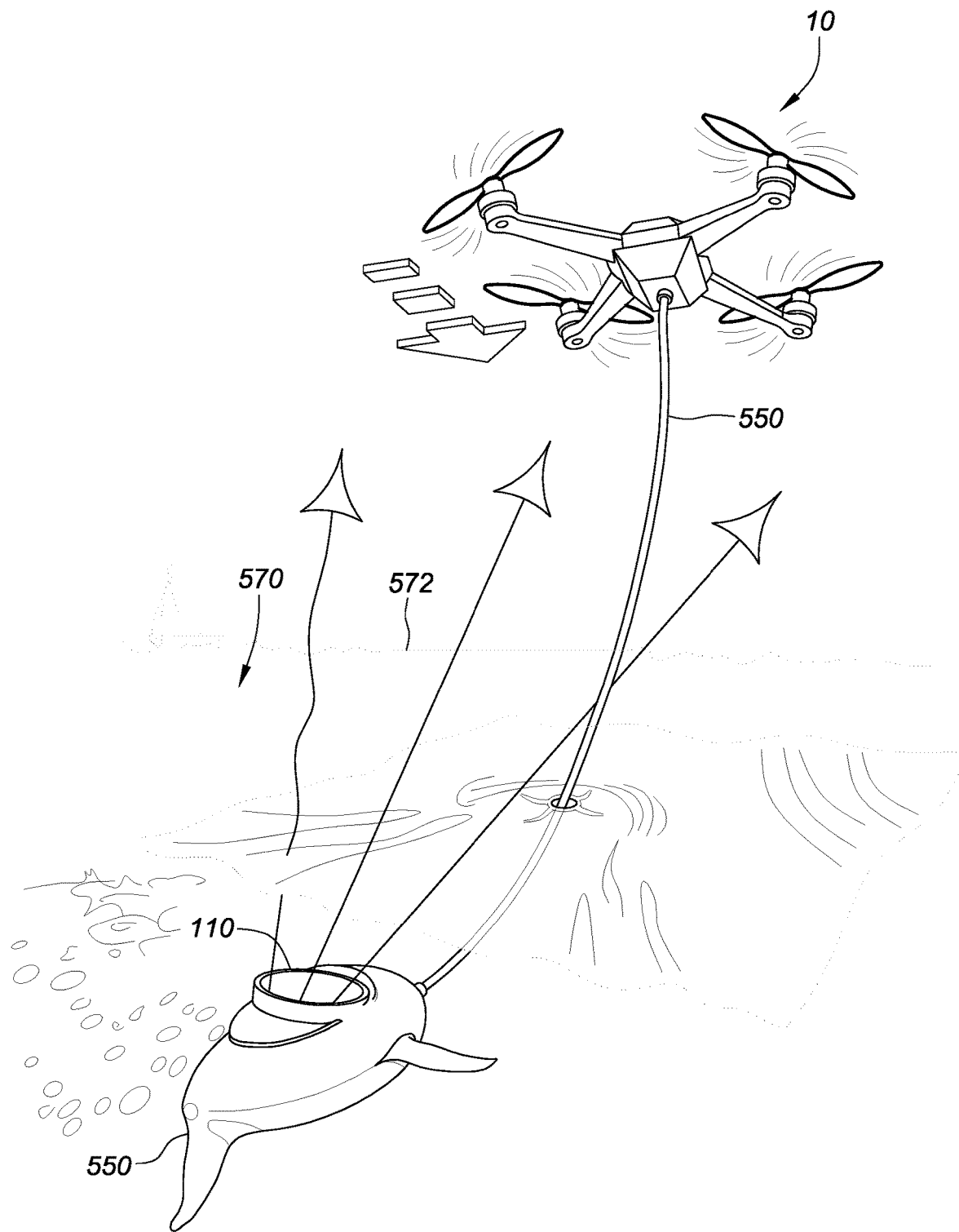
FIG. 14 shows a UAV tethered to and towing a lighted vessel in a pool or other body of water.

In another embodiment as shown in FIG. 14, lights 110 may be operated under water and also contribute to the overall effect of the water and lighting display. Here, light 110 may be mounted to a vessel 550 that may function like a submarine in that it may travel at or under the water surface 572. Vessel 550 may be connected to UAV 10 by tether 560. In this manner, UAV 10 may tow vessel 550 around the reservoir or pool 570 housing the display. Because light 110 is either submerged or in touch with the water at surface 572, it is being cooled. Vessel 550 may carry batteries to power light 110 so they need not be carried by UAV 10 thereby avoiding weight issues. This embodiment represents an advance over existing displays that typically include only lights that are fixed to the reservoir floor and cannot travel. Furthermore, light 110 may bob up and down in relation to water surface 572 thereby providing a shimmering effect.

Other aspects of the current invention are now described. As mentioned earlier, light(s) 110 may use a laser as the light source. In many respects, LEDs 112 may be replaced by lasers and the foregoing lighting and cooling mechanisms may function as described above.

However, certain lasers that may be relatively small may still provide significant light to overcome light pollution or daytime flights, but not require significant cooling as described above. Accordingly, the current invention includes the use of lasers in connection with a UAV, regardless if cooling systems are employed. In any event, higher power lasers that require cooling may be accommodated by the above-described cooling mechanisms. The use of laser is desirable because a laser may provide an image on a surface even during bright daylight which may provide an advantage over certain LED displays.

Another aspect of the invention involves mounting lights 110—be it an LED or laser—on a programmable mount that may move relative to UAV 10. This may allow light(s) 110 to write or produce an image on a surface.

UAV 10 may also include controls to avoid pointing the LED or laser light(s) 110 at observers. To this end, GPS and suitable software may control the orientation of UAV 10

Referring again to FIG. 2, UAV 10 may include tether 99 that couples UAV 10 to a ground-based station or operator. Tether 99 may provide safety by preventing UAV 10 from simply flying off. Tether 99 may also provide power and other control signals. This avoids the need to recharge or replace batteries or other power source. Furthermore, the duty cycle of the signal provided by tether 99 may remain constant.

An advantage of tether 99 is that it may allow UAV to be fitted with more lights 110 because no battery or other on-board power source is needed. In other words, more lights 110 may be added because the increase in weight they represent is offset by the subtracted weight of the battery.

Another advantage of tether 99 is that it allows the use of electrical signals to control UAV 10, as opposed to the radio frequency that is typically used with untethered UAVs. This is a benefit because radio signals may be interfered with by nearby electrical appliances and/or third parties. To this end, tether 99 allows two way communication between the operator and UAV 10. That is, tether 99 may also support signals from UAV 10 to the ground. Such signals may include position data and status of lights 110 or other on-board appliances.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. A water and lighting display, comprising:
   one or more nozzles that are each configured to emit a stream of water, thereby providing one or more emitted streams of water; and
   an unmanned aerial vehicle (UAV) system, comprising:
   a UAV including one or more propellers having propeller blades that generate airflow when the propeller blades spin;
   a lighting and cooling system connected to the UAV, wherein the lighting and cooling system includes:
   one or more lights that generate heat;
   a thermally conductive plate that is attached to the one or more lights, that extends between the one or more lights and around their periphery to provide thermal conduction of heat away from the one or more lights, that positions the one or more lights under the propeller blades to provide convection cooling from the airflow generated by the propeller blades, and that has a surface adapted to absorb heat from the one or more lights;

wherein the UAV system flies as part of the water and lighting display so that the one or more lights illuminate the one or more emitted streams of water.

2. The water and lighting display of claim 1, wherein the UAV includes at least one light that is configured to illuminate objects viewable from the ground.

3. The water and lighting display of claim 1, wherein the one or more lights are LEDs and/or lasers.

4. The water and lighting display of claim 1, wherein the UAV further includes a liquid cooling system that transfers heat away from the one or more lights.

5. The water and lighting display of claim 1, wherein the UAV further includes a dedicated fan that is positioned in proximity to the one or more lights to provide additional cooling.

6. The water and lighting display of claim 1, further comprising:
- a reservoir that contains water and that includes a water surface; and
- a vessel that is connected to the UAV by a tether, that travels at or below the water surface, and that includes a power supply;
- wherein the vessel provides power to the UAV from the power supply through the tether.

7. The water and lighting display of claim 6, wherein the UAV includes at least one light that is configured to illuminate objects viewable from the ground.

8. The water and lighting display of claim 7, wherein the UAV includes a liquid cooling system that transfers heat away from the one or more lights and/or a dedicated fan that is positioned in proximity to the one or more lights.

9. The water and lighting display of claim 6, wherein the vessel includes a power supply and provides power to the UAV from the power supply through the tether.

10. The water and lighting display of claim 6, wherein the UAV tows the vessel.

11. The water and lighting display of claim 6, wherein the vessel includes a vessel light.

12. The water and lighting display of claim 11, wherein the vessel is at or below the surface of the water and the vessel light is cooled by the water.

13. The water and lighting display of claim 6, wherein the vessel tows the UAV.

14. The water and lighting display of claim 6, wherein the vessel is below the surface of the water.

15. The water and lighting display of claim 1, wherein the one or more lights are cooled by water from the one or more water streams.

16. The water and lighting display of claim 1, wherein the one or more emitted streams of water are shaped as a fan.

* * * * *